(12) United States Patent
Norieda et al.

(10) Patent No.: US 12,488,073 B2
(45) Date of Patent: Dec. 2, 2025

(54) LOCKER SYSTEM, LOCKER MANAGEMENT SYSTEM, AND LOCKER MANAGEMENT METHOD

(71) Applicant: NEC Corporation, Tokyo (JP)

(72) Inventors: Shin Norieda, Tokyo (JP); Kenta Fukuoka, Tokyo (JP); Masashi Yoneda, Tokyo (JP); Shogo Akasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 194 days.

(21) Appl. No.: 17/797,856

(22) PCT Filed: Feb. 28, 2020

(86) PCT No.: PCT/JP2020/008516
§ 371 (c)(1),
(2) Date: Aug. 5, 2022

(87) PCT Pub. No.: WO2021/171616
PCT Pub. Date: Sep. 2, 2021

(65) Prior Publication Data
US 2023/0068391 A1    Mar. 2, 2023

(51) Int. Cl.
*G06F 21/32* (2013.01)
*H04L 9/40* (2022.01)

(52) U.S. Cl.
CPC .......... *G06F 21/32* (2013.01); *H04L 63/0861* (2013.01)

(58) Field of Classification Search
CPC ....... G06F 21/32; G06F 3/017; H04L 63/0861
See application file for complete search history.

(56) References Cited

U.S. PATENT DOCUMENTS

| 10,068,403 | B1* | 9/2018 | McGehee | G07C 9/00912 |
| 2009/0141117 | A1* | 6/2009 | Elberbaum | H04N 7/186 |
| | | | | 348/14.04 |
| 2014/0266604 | A1* | 9/2014 | Masood | G06V 40/19 |
| | | | | 340/5.83 |
| 2014/0361988 | A1* | 12/2014 | Katz | G06T 7/70 |
| | | | | 345/156 |

(Continued)

FOREIGN PATENT DOCUMENTS

| CN | 201094465 Y | 8/2008 |
| CN | 104778391 A | 7/2015 |

(Continued)

OTHER PUBLICATIONS

JP Office Communication for JP Application No. 2022-503054, mailed on Oct. 24, 2023 with English Translation.

(Continued)

*Primary Examiner* — Dao Q Ho

(57) ABSTRACT

Provided is a locker system in which usefulness to a locker user is increased. The locker system comprises an acquisition unit, a determination unit, and a locker control unit. The acquisition unit acquires biological information about the user. The determination unit determines a request relating to the locker use of the user. The locker control unit opens a locker specified on the basis of the request relating to the locker use in relation to a user specified by a comparison process using the biological information.

5 Claims, 28 Drawing Sheets

(56) References Cited

U.S. PATENT DOCUMENTS

| | | | | |
|---|---|---|---|---|
| 2015/0348345 | A1* | 12/2015 | Ogishi | G06Q 10/083 340/5.6 |
| 2015/0369612 | A1* | 12/2015 | Nishimura | G01C 21/3484 701/537 |
| 2016/0259183 | A1* | 9/2016 | Rayner | G02C 11/10 |
| 2016/0364009 | A1* | 12/2016 | Lemberger | H04N 21/4424 |
| 2018/0365641 | A1* | 12/2018 | Zhu | G06K 7/1417 |
| 2019/0347390 | A1* | 11/2019 | Kim | G06N 7/01 |
| 2020/0357209 | A1* | 11/2020 | Kochi | G07C 9/00563 |
| 2021/0194691 | A1* | 6/2021 | Mars | H04L 9/0894 |

FOREIGN PATENT DOCUMENTS

| | | |
|---|---|---|
| CN | 106815944 A | 6/2017 |
| CN | 108154615 A | 6/2018 |
| CN | 108280942 A | 7/2018 |
| CN | 108734886 A | 11/2018 |
| CN | 108961494 A | 12/2018 |
| CN | 109272671 A | 1/2019 |
| CN | 110009828 A | 7/2019 |
| CN | 110491036 A | 11/2019 |
| JP | S64-083210 A | 3/1989 |
| JP | 2004-011397 A | 1/2004 |
| JP | 2006-336366 A | 12/2006 |
| JP | 2008-197711 A | 8/2008 |
| JP | 2009-020735 A | 1/2009 |
| JP | 2011-038329 A | 2/2011 |
| JP | 2012-057371 A | 3/2012 |
| JP | 2016-017331 A | 2/2016 |
| JP | 2017-107402 A | 6/2017 |
| JP | 2018-036821 A | 3/2018 |
| JP | 2018-116527 A | 7/2018 |
| JP | 2019-037389 A | 3/2019 |
| JP | 2019-200593 A | 11/2019 |
| JP | 2019-219721 A | 12/2019 |
| KR | 20100045075 A | 5/2010 |

OTHER PUBLICATIONS

CN Office Action for CN Application No. 202080097679.4, mailed on Jan. 18, 2024 with English Translation.
International Search Report for PCT Application No. PCT/JP2020/008516, mailed on May 26, 2020.
English translation of Written opinion for PCT Application No. PCT/JP2020/008516, mailed on May 26, 2020.
JP Office Action for JP Application No. 2022-503054, mailed on Jul. 2, 2024 with English Translation.

* cited by examiner

Fig.9

```
┌─────────────────────────────────────────┐
│         SYSTEM USER REGISTRATION        │
│                                         │
│         NAME  [_____]    │
│                                         │
│     EMPLOYEE  [_____]    │
│      NUMBER                             │
│                                         │
│   DEPARTMENT  [_____]    │
│                                         │
│     POSITION  [_____]    │
│                                         │
│      CONTACT  [_____]    │
│      ADDRESS                            │
│                     ⋮                   │
│                                         │
│      PLEASE REGISTER FACE IMAGE FILE    │
│                                         │
│             [ SELECTION OF FILE ]       │
│                                         │
│   PLEASE SELECT NEW REGISTRATION OR     │
│       UPDATE OF REGISTRATION CONTENT    │
│                                         │
│         [   NEW    ]    [  UPDATE  ]    │
│         [REGISTRATION]                  │
│                                         │
│         [       TRANSMIT        ]       │
│                                         │
└─────────────────────────────────────────┘
```

Fig.10

USER DATABASE

| USER ID | FEATURE AMOUNT | FACE IMAGE | NAME | EMPLOYEE NUMBER | DEPARTMENT | POSITION | ... |
|---------|----------------|------------|------|-----------------|------------|----------|-----|
| ID01 | FV1 | F1 | AAA | 12345X1 | X11 | X21 | ... |
| ID02 | FV2 | F2 | BBB | 12345X2 | X12 | X22 | ... |
| ID03 | FV3 | F3 | CCC | 12345X4 | X13 | X23 | ... |
| ... | ... | ... | ... | ... | ... | ... | ... |

Fig.11

ENTRANCE PERSON
MANAGEMENT DATABASE

| USER ID | ENTRANCE TIME AND DATE |
|---------|------------------------|
| ID01    | 2020/1/20 12:01:01     |
| ID02    | 2020/1/20 12:10:13     |
| ID03    | 2020/1/20 12:13:25     |
| ID04    | 2020/1/20 12:30:30     |
| ...     | ...                    |

Fig.12A

LOCKER MANAGEMENT DATABASE

| LOCKER ID | ATTRIBUTE | USAGE STATUS |
|---|---|---|
| R01 | SMALL SIZE | — |
| R02 | SMALL SIZE | ID01 |
| R03 | LARGE SIZE | — |
| R04 | SMALL SIZE | — |
| ⋮ | ⋮ | ⋮ |

Fig.12B

LOCKER MANAGEMENT DATABASE

| LOCKER ID | ATTRIBUTE | USAGE STATUS |
|---|---|---|
| R01 | UPPER STAGE | — |
| R02 | INTERMEDIATE STAGE | ID01 |
| R03 | LOWER STAGE | — |
| R04 | UPPER STAGE | — |
| ⋮ | ⋮ | ⋮ |

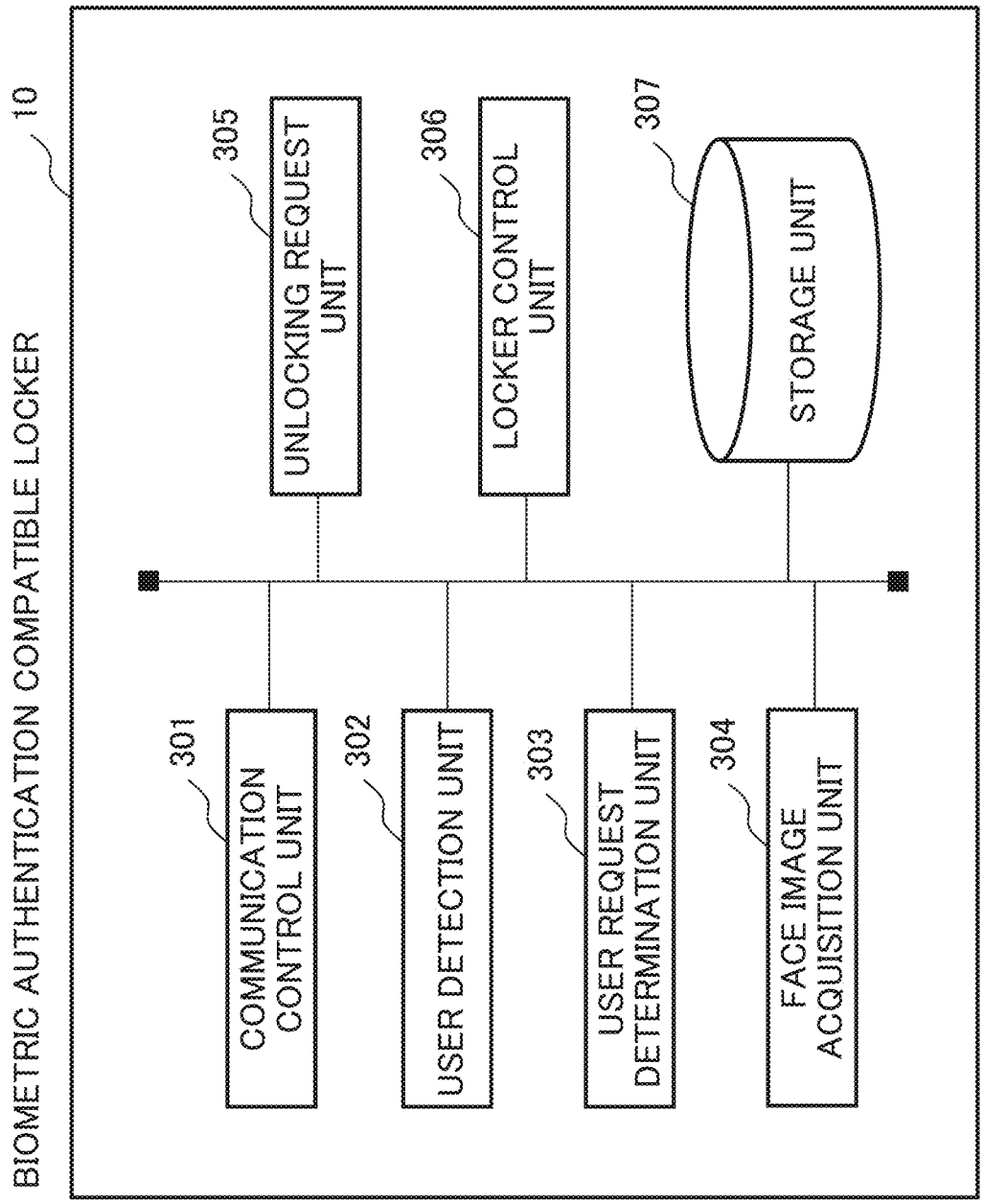

Fig.19

BAGGAGE IS IN THE LOCKER.

Fig.22

EQUIPMENT RESERVATION

NAME

EMPLOYEE NUMBER

DEPARTMENT

EQUIPMENT

USAGE PERIOD

TRANSMIT

Fig.23

EQUIPMENT MANAGEMENT DATABASE

| USER ID | DEPARTMENT | EQUIPMENT | USAGE PERIOD |
|---|---|---|---|
| ID21 | X31 | B01 | 2020/1/20 10:00~12:00 |
| ID22 | X32 | B02 | 2020/1/21 13:00~15:00 |
| ID23 | X33 | B03 | 2020/1/22 16:00~17:00 |
| ... | ... | ... | ... |

Fig.24

LOCKER MANAGEMENT DATABASE

| LOCKER ID | ATTRIBUTE | EQUIPMENT | USAGE STATUS |
|---|---|---|---|
| R01 | SMALL SIZE | B01 | ID21 |
| R02 | SMALL SIZE | B02 | — |
| R03 | LARGE SIZE | B03 | — |
| R04 | SMALL SIZE | — | — |
| ... | ... | ... | ... |

LOCKER SYSTEM, LOCKER MANAGEMENT SYSTEM, AND LOCKER MANAGEMENT METHOD

This application is a National Stage Entry of PCT/JP2020/008516 filed on Feb. 28, 2020, the contents of all of which are incorporated herein by reference, in their entirety.

TECHNICAL FIELD

The present invention relates to a locker system, a locker management system, a locker management method, and a storage medium.

BACKGROUND ART

In recent years, various ways of working have been promoted. For example, a "free address" has been promoted in which work is performed without determining a specific desk and by freely using empty seats. Here, an employee belonging to a specific department may use one floor compatible with a free address, but an unspecified number of users may use the floor beyond the department or company.

The user may temporarily leave the floor. In a case where an unspecified number of users are mixed on the same floor, the user temporarily leaving the floor needs to store baggage in the locker.

PTL 1 describes providing a locker system that enables an authentication procedure of a user by remote operation and prevents human erroneous operation when a deposited baggage is taken out in an emergency. In a case where the locker box is temporarily locked, the locker system disclosed in PTL 1 drives the imaging unit to image the user until the completion of the payment processing using the operation display unit. The locker system performs main locking by storing one or more images at a predetermined timing among the captured images as a first image in association with the number of the locker box. The locker system captures an image by the imaging unit in response to a baggage receiving operation on the operation display unit, and transmits an unlock request to the management center together with the second image, the first image, and the number of the locker box captured in response to the receiving operation. The locker system unlocks the locker box associated to the locker number on the basis of an unlocking instruction transmitted from the management center according to a comparison result between the first image and the second image based on the unlocking request.

CITATION LIST

Patent Literature

[PTL 1] JP 2019-200593 A

SUMMARY OF INVENTION

Technical Problem

As described above, a locker (locker box) is required for the free address floor or the like. When using an existing locker, the user pays a fee on the locker, and locks the locker stored with baggage with a physical key. Such a type of locker that locks using a physical key is not suitable for temporary storage (deposit) of baggage on the free address floor. This is because the user needs to pay a fee and lock the key each time the user temporarily leaves the free address floor.

A main object of the present invention is to provide a locker system, a locker management system, a locker management method, and a storage medium that contribute to improving usefulness of a locker user.

Solution to Problem

According to a first aspect of the present invention, there is provided a locker system including: an acquisition unit configured to acquire biological information of a user; a determination unit configured to determine a request relating to locker use of the user; and a locker control unit configured to unlock a locker specified based on a request relating to the locker use in relation to a user specified by a comparison process using the biological information.

According to a second aspect of the present invention, there is provided a locker management system including: a server device; and a locker system connected to the server device. The locker system includes: an acquisition unit configured to acquire biological information of a user; a determination unit configured to determine a request relating to locker use of the user; a request unit configured to transmit a locker unlocking request including the biological information and a request relating to the locker use to the server device; and a locker control unit configured to unlock a locker based on a response acquired from the server device. The server device specifies the user by a comparison process using biological information included in the locker unlocking request, specifies the locker to be unlocked based on a request relating to the locker use included in the locker unlocking request, and includes a locker ID of the specified locker in a response to the locker unlocking request.

According to a third aspect of the present invention, there is provided a locker management method that is performed in a locker system, including: acquiring biological information of a user; determining a request relating to locker use of the user; and unlocking a locker specified based on a request relating to the locker use in relation to a user specified by a comparison process using the biological information.

According to a fourth aspect of the present invention, there is provided a computer-readable storage medium storing a program for causing a computer mounted on a locker system to execute processing of: acquiring biological information of a user; determining a request relating to locker use of the user; and unlocking a specified locker based on the request relating to the locker use in relation to the user specified by a comparison process using the biological information.

Advantageous Effects of Invention

According to each aspect of the present invention, a locker system, a locker management system, a locker management method, and a storage medium that contribute to improving usefulness of a locker user are provided. The effect of the present invention is not limited to the above. According to the present invention, other effects may be exhibited instead of or in addition to the effects.

BRIEF DESCRIPTION OF DRAWINGS

FIG. 9 is a diagram for explaining an operation of a user information acquisition unit according to the first example embodiment.

FIG. 10 is a diagram illustrating an example of a user database according to the first example embodiment.

FIG. 11 is a diagram illustrating an example of an entrance person management database according to the first example embodiment.

FIG. 12A is a diagram illustrating an example of a locker management database according to the first example embodiment.

FIG. 12B is a diagram illustrating an example of the locker management database according to the first example embodiment.

FIG. 13 is a diagram illustrating an example of a processing configuration of the biometric authentication compatible locker according to the first example embodiment.

FIG. 19 is a diagram for explaining an operation of a gate control unit according to a fourth example embodiment.

FIG. 22 is a diagram for explaining an operation of an equipment management unit according to the fifth example embodiment.

FIG. 23 is a diagram illustrating an example of an equipment management database according to the fifth example embodiment.

FIG. 24 is a diagram illustrating an example of a locker management database according to the fifth example embodiment.

EXAMPLE EMBODIMENT

Figure 1:
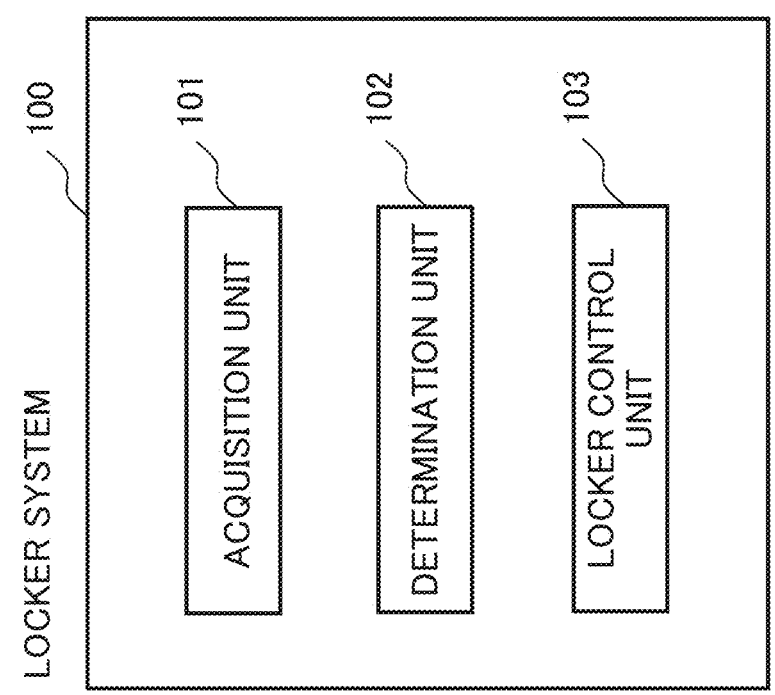
FIG. 1 is a diagram for explaining an outline of an example embodiment.

First, an outline of an example embodiment will be described. The reference numerals in the drawings attached to this outline are attached to each element for convenience as an example for assisting understanding, and the description of this outline is not intended to be any limitation. In a case where there is no particular explanation, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description can be omitted.

A locker system 100 according to one example embodiment includes an acquisition unit 101, a determination unit 102, and a locker control unit 103 (see FIG. 1). The acquisition unit 101 acquires biological information about the user. The determination unit 102 determines a request relating to the locker use of the user. The locker control unit 103 unlocks a locker specified on the basis of a request relating to the locker use in relation to a user specified by a comparison process using the biological information.

The locker system 100 acquires biological information (for example, a face image) of the user, and determines a request (for example, storing and taking out baggage) relating to the locker use of the user. The locker system 100 transmits the biological information and the request relating to the locker use to, for example, a control device that manages and controls the use of the locker. The server device specifies the locker user by comparison using the acquired biological information. The server device specifies a locker to be unlocked according to a request of the specified locker user, and transmits an ID of the specified locker to the locker system 100. The locker system 100 unlocks the locker associated to the acquired locker ID. As described above, since the locker management system including the locker system 100 unlocks the locker by the biometric authentication of the user, the usefulness of the locker user is improved. That is, the locker user does not need to input a fee (coin) required in the existing locker system, lock the locker by a physical key, or the like. The locker system 100 may achieve the function of the server device by the own device without transmitting the biological information and the request relating to the locker use to the server device. That is, the locker system 100 may store the biological information of the user who can use the locker, and compare (specify) the user using the stored biological information.

Hereinafter, specific example embodiments will be described in more detail with reference to the drawings.

First Example Embodiment

A first example embodiment will be described in more detail with reference to the drawings.

Figure 2:
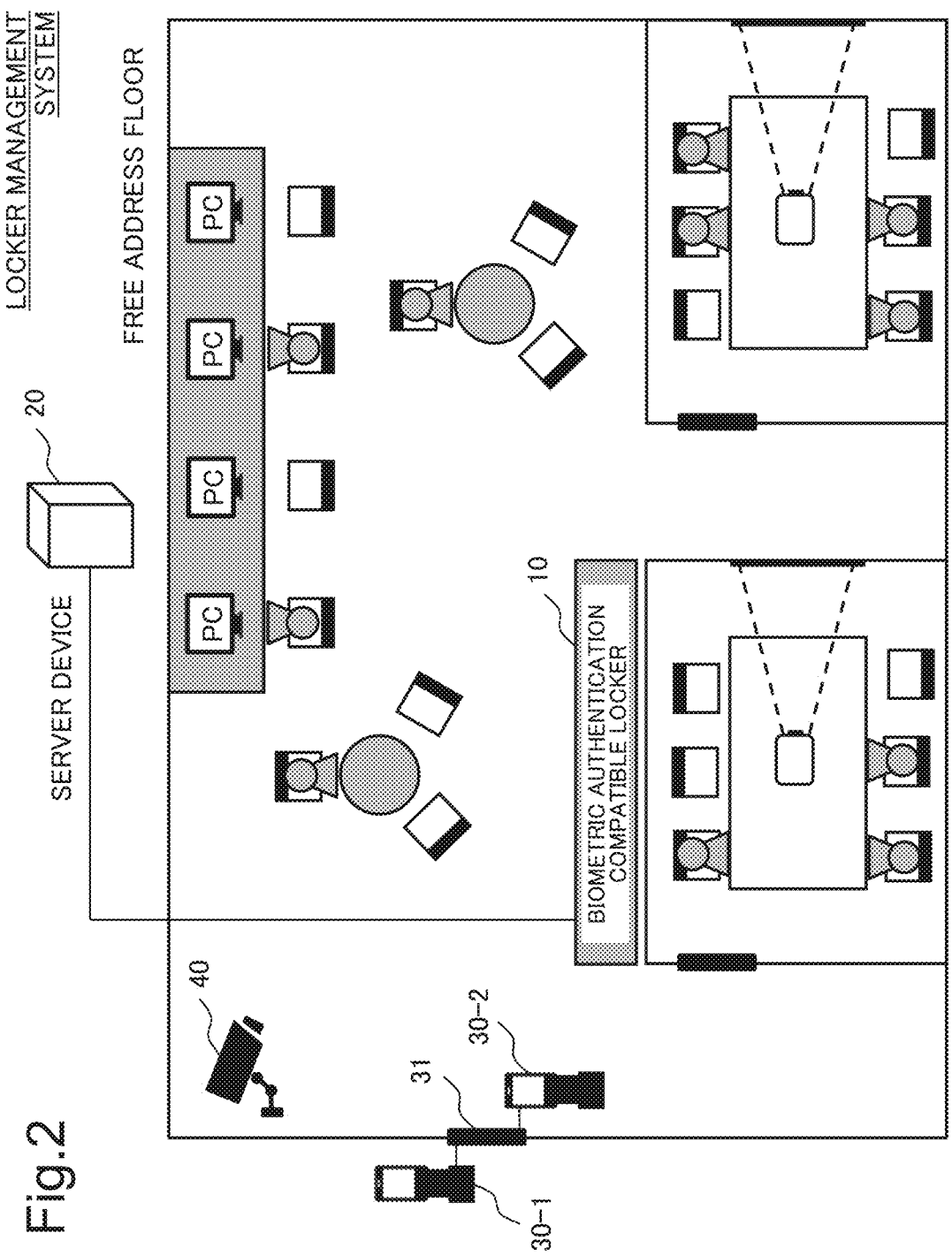
FIG. 2 is a diagram illustrating an example of a schematic configuration of a locker management system according to a first example embodiment.

FIG. 2 is a diagram illustrating an example of a schematic configuration of a locker management system according to the first example embodiment. Referring to FIG. 2, the locker management system includes a biometric authentication compatible locker 10, a server device 20, an entrance management terminal 30-1, an exit management terminal 30-2, and a camera device 40.

The devices illustrated in FIG. 2 are connected to each other. For example, the biometric authentication compatible locker 10 and the server device 20 are connected by wired or wireless communication means, and are configured to be able to communicate with each other. Although FIG. 2 illustrates a connection line between the biometric authentication compatible locker 10 and the server device 20, other components (the entrance management terminal 30-1, the exit management terminal 30-2, the camera device 40) are also connected to the server device 20. Further, a stationary personal computer (PC) installed in the floor is also connected to the server device 20.

In the following description, when there is no particular reason to distinguish the entrance management terminal 30-1 and the exit management terminal 30-2, they are simply described as "terminal 30".

The server device 20 may be installed in the same building as the biometric authentication compatible locker 10, or may be installed on a network (on a cloud).

The floor illustrated in FIG. 2 is a so-called free address floor, and employees freely select vacant seats to do work. The biometric authentication compatible locker 10 is installed on the free address floor. However, it is a matter of course that the installation place of the biometric authentication compatible locker 10 of the present disclosure is not intended to be limited to the free address floor. The biometric authentication compatible locker 10 may be installed in a place where an unspecified number of users visit, such as a station or an airport.

The biometric authentication compatible locker 10 is a locker system for storing the belongings (for example, clothes, notebook computers, writing tools, and the like.) of the floor user. The biometric authentication compatible locker 10 specifies the user by biometric authentication, and performs an operation according to the specified user. For example, the biometric authentication compatible locker 10 specifies the user using the "face" of the user. In the present disclosure, a case where a "face image" or a "feature amount generated from the face image" is handled as biological information will be mainly described. However, the biological information is not limited to the "face image" or the like, and other biological information (for example, iris or the like) may be used for authentication.

Figure 3:
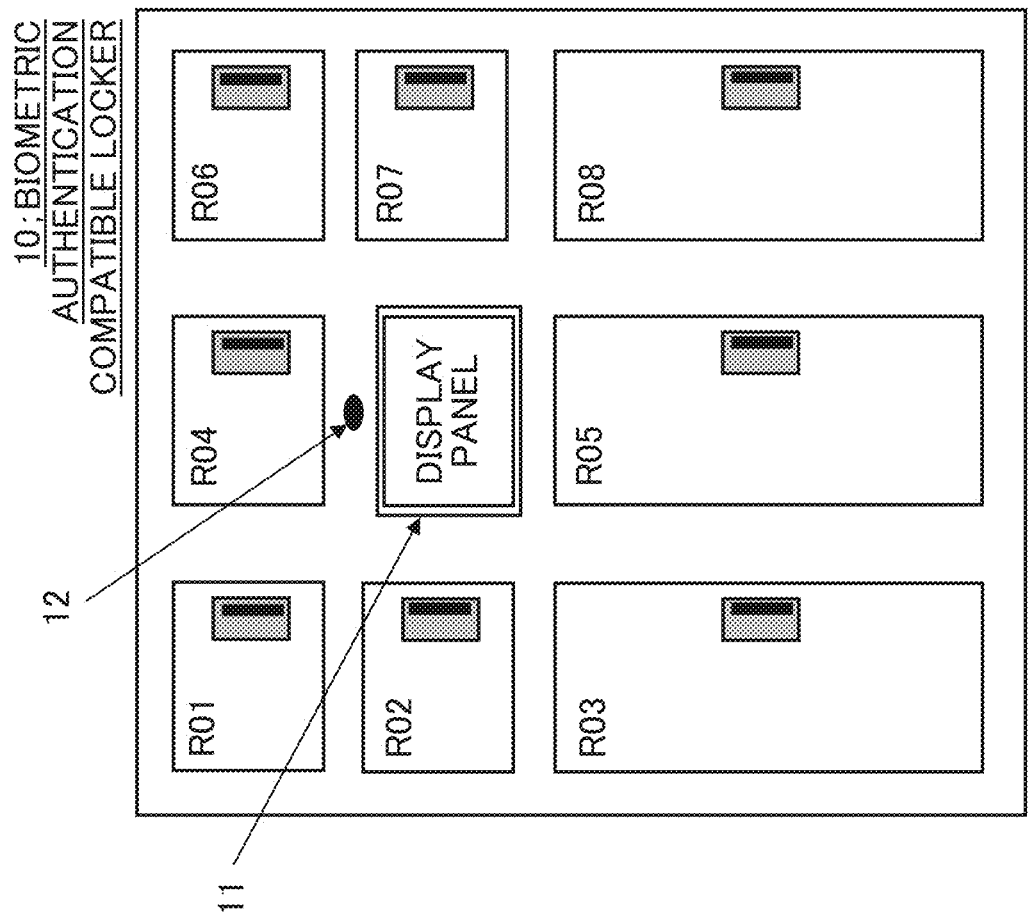
FIG. 3 is a diagram illustrating an example of an appearance of a biometric authentication compatible locker according to the first example embodiment.

FIG. 3 is a diagram illustrating an example of an external appearance (front view) of the biometric authentication compatible locker 10. As illustrated in FIG. 3, the biometric authentication compatible locker 10 includes a plurality of lockers (eight locker boxes in the example of FIG. 3), a display panel 11, and a camera 12. The biometric authentication compatible locker 10 includes lockers having different sizes (different storage capacities for baggage and the like). Characters and numbers described on the upper left of each locker illustrated in FIG. 3 indicate the number (locker number) of each locker.

The display panel 11 provides various types of information to the user. The display panel 11 and an operation device such as a touch panel are integrated. The biometric authentication compatible locker 10 receives an operation of the user via the touch panel. A graphical user interface (GUI) is provided to the user by the display panel 11 and the touch panel.

The camera 12 is installed in such a way as to be able to image the user standing in front of the own device (biometric authentication compatible locker 10).

The server device 20 illustrated in FIG. 2 is a device that controls and manages various devices in the floor including the biometric authentication compatible locker 10. For example, the server device 20 controls the biometric authentication compatible locker 10.

The entrance management terminal 30-1 is a terminal installed at the entrance of the free address floor. The entrance management terminal 30-1 is connected to a gate 31. When a floor visitor is successfully authenticated, the entrance management terminal 30-1 opens the gate 31 to allow the visitor to enter the free address floor.

The exit management terminal 30-2 is a terminal installed at the exit of the free address floor. The exit management terminal 30-2 is also connected to the gate 31 similarly to the entrance management terminal 30-1. The exit management terminal 30-2 opens the gate 31 upon successful authentication of an exit person (specification of the exit person).

FIG. 2 illustrates a case where floor visitors are managed by the terminal 30 (the entrance management terminal 30-1, the exit management terminal 30-2) and the gate 31. However, as described above, in a case where the biometric authentication compatible locker 10 is installed in a place such as a station or an airport, the above-described device is unnecessary. That is, in the locker management system of the disclosure of the present disclosure, the terminal 30 and the gate 31 may not be installed.

The server device 20 manages the entrance and exit of floor users using the entrance management terminal 30-1 and the exit management terminal 30-2.

At least one or more camera devices 40 are installed on the floor illustrated in FIG. 2. The camera device 40 is installed in such a way as to look down the entire floor. Although one camera device 40 is illustrated in FIG. 2, in a case where a plurality of camera devices 40 is required to obtain an image looking down the entire floor, the camera devices 40 are installed as many as to achieve the object.

[Outline of System Operation]

An outline of an operation of the locker management system according to the first example embodiment will be described with reference to FIG. 2.

When a visitor of the floor moves in front of the entrance management terminal 30-1, the entrance management terminal 30-1 acquires a face image of the visitor. The entrance management terminal 30-1 transmits the acquired face image to the server device 20, and requests authentication processing of the visitor. When the authentication of the visitor is successful, the server device 20 notifies the entrance management terminal 30-1 of the successful authentication. Upon receiving the notification, the entrance management terminal 30-1 opens the gate 31 to allow the visitor to enter.

The server device 20 manages the entrance person in the floor based on the result of the authentication process.

When an entrance person in the floor moves in front of the exit management terminal 30-2, the exit management terminal 30-2 acquires the face image of the entrance person. The exit management terminal 30-2 transmits the acquired face image to the server device 20, and requests authentication processing of the entrance person. When the authentication of the entrance person is successful, the server device 20 notifies the exit management terminal 30-2 of the successful authentication. The exit management terminal 30-2 that has received the notification opens the gate 31 and permits the entrance person to exit.

In the case of temporarily leaving the free address floor, the entrance person stores a baggage (article, object) in the biometric authentication compatible locker 10. The locker user moves to the front of the biometric authentication compatible locker 10 (especially in front of the camera 12).

Figure 4:
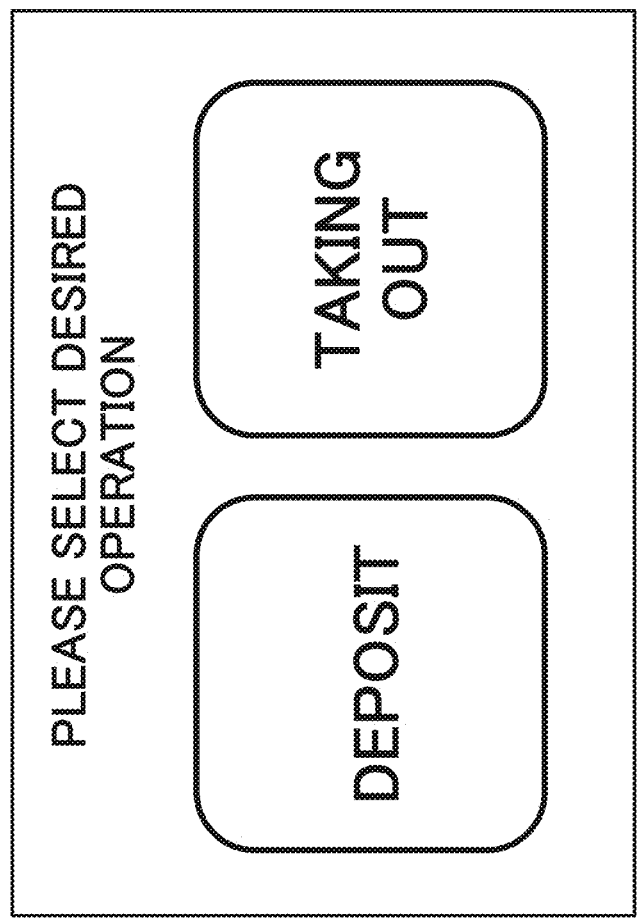
FIG. 4 is a diagram illustrating an example of display by the biometric authentication compatible locker according to the first example embodiment.

Upon confirming the presence of the user, the biometric authentication compatible locker 10 provides the user with a GUI that accepts an operation related to the user's request (storing and taking out baggage). For example, the biometric authentication compatible locker 10 performs display as illustrated in FIG. 4, and grasps the request of the user.

Figure 5:
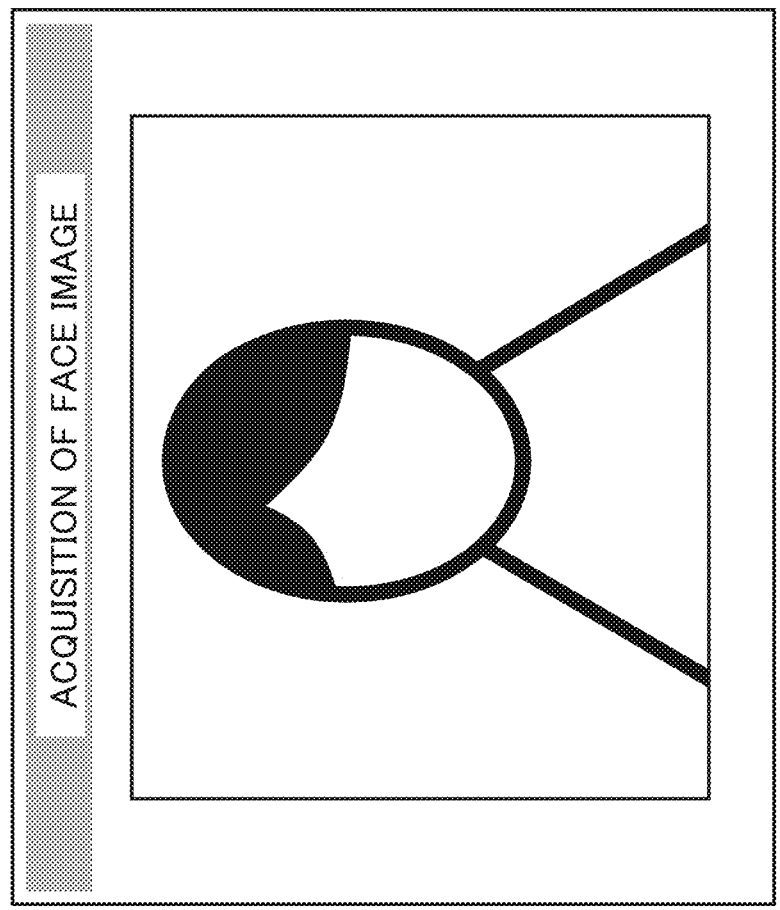
FIG. 5 is a diagram illustrating an example of display by the biometric authentication compatible locker according to the first example embodiment.

The biometric authentication compatible locker 10 acquires a face image of the user standing in front. For example, the biometric authentication compatible locker 10 acquires the face image while making it clear to the user that the face image is acquired by displaying as illustrated in FIG. 5.

The biometric authentication compatible locker 10 transmits a request of the user (storing and taking out baggage) and a "locker unlocking request" including the face image of the user to the server device 20.

The server device 20 takes out the face image from the acquired locker unlocking request, and performs a comparison process using the face image. The server device 20 specifies the locker user from among the floor visitors by executing the comparison process.

Regarding the specified locker user, the server device 20 controls and manages the locker according to the request (storing and taking out baggage) of the user included in the locker unlocking request.

Specifically, if the request of the user is "storage of baggage", the server device 20 selects an empty locker in which no baggage is stored, and stores the selected locker and the user in association with each other. The server device 20 transmits, to the biometric authentication compatible locker 10, a response including information specifying the selected locker (for example, the locker number), the request of the user (storage of baggage), and the like.

If the user's request is "taking out baggage", the server device 20 specifies a locker in which the specified user's baggage is stored. The server device 20 transmits a response including the specified locker number, the user's request (taking out baggage), and the like to the biometric authentication compatible locker 10.

Figure 6A:
FIG. 6A is a diagram illustrating an example of display by the biometric authentication compatible locker according to the first example embodiment.
Figure 6B:
FIG. 6B is a diagram illustrating an example of display by the biometric authentication compatible locker according to the first example embodiment.

The biometric authentication compatible locker 10 that has received the response to the locker unlocking request performs an operation according to the response. For example, the biometric authentication compatible locker 10 that has received the locker number together with "storage of baggage" performs display as illustrated in FIG. 6A and opens the corresponding locker. Alternatively, the biometric authentication compatible locker 10 that has received the locker number together with "taking out baggage" performs display as illustrated in FIG. 6B and opens the corresponding locker.

When closing of the opened locker is detected, the biometric authentication compatible locker 10 detects whether baggage exists in the locker. Upon completion of the detection processing, the biometric authentication compatible locker 10 transmits "baggage presence/absence information" to the server device 20. The baggage presence/absence information includes a locker number of a closed locker and information (baggage status) regarding the presence or absence of baggage in the locker.

The server device 20 ensures consistency between the management status of the locker and the actual status (presence or absence of baggage) in the locker on the basis of the baggage presence/absence information acquired from the biometric authentication compatible locker 10.

<Preliminary Preparation>

A system user (a user of the free address floor) needs to make a preliminary preparation. The preliminary preparation will be described below.

The user registers attribute values such as user's biological information and profile in the system. Specifically, the user inputs the face image to the server device 20. The user inputs user's profile (for example, a name, an employee number, a place of employment, a department to which the employee belongs, a position, a contact address, and the like) to the server device 20.

Any method can be used to input information such as the biological information and the profile. For example, the user captures user's face image using a terminal such as a smartphone. Further, the user generates a text file or the like in which the profile is described using the terminal. The user operates the terminal to transmit the information (face image, profile) to the server device 20. Alternatively, the user may input necessary information to the server device 20 using an external storage device such as a universal serial bus (USB) in which the information is stored.

Alternatively, the server device 20 may have a function as a web (WEB) server, and the user may input necessary information by a form provided by the server. Alternatively, a terminal for inputting the information may be installed outside the floor, and the user may input necessary information from the terminal to the server device 20. Alternatively, the user may input necessary information to the server device 20 from the entrance management terminal 30-1.

The server device 20 updates the database that manages the system user using the acquired user information (biological information, profiles, etc.). Details regarding the update of the database will be described later, but the server device 20 roughly updates the database by the following operation. In the following description, a database for managing users using the system of the present disclosure will be referred to as a "user database".

When the person associated to the acquired user information is a new user not registered in the user database, the server device 20 assigns an identifier (ID) to the user. The server device 20 generates a feature amount that characterizes the acquired face image.

The server device 20 adds an entry including the ID assigned to the new user, the feature amount generated from the face image, the face image of the user, the profile, and the like to the user database. When the server device 20 registers the user information, the user can enter the free address floor.

Next, details of each device included in the locker management system according to the first example embodiment will be described.

[Server Device]

Figure 7:
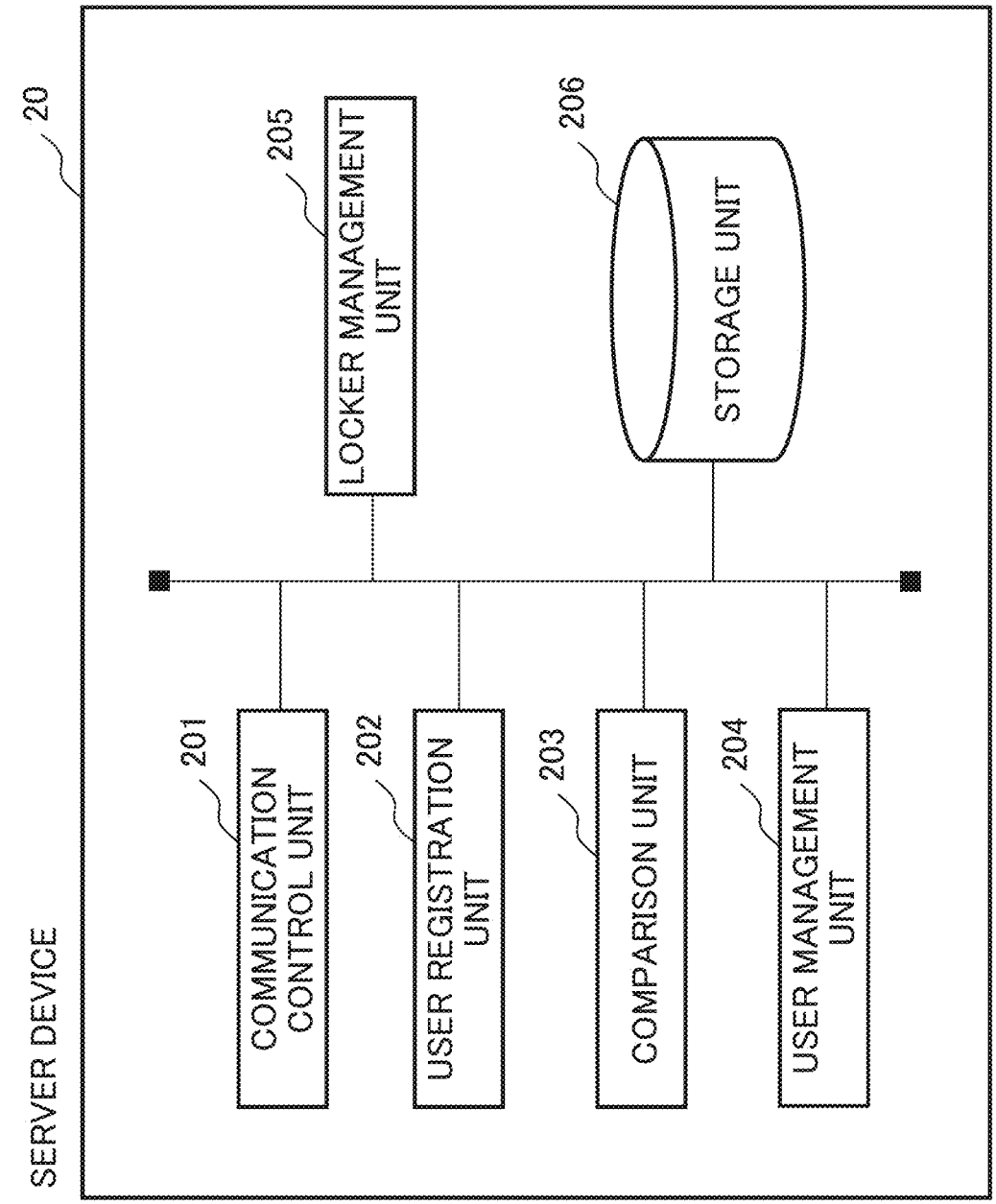
FIG. 7 is a diagram illustrating an example of a processing configuration of a server device according to the first example embodiment.

FIG. 7 is a diagram illustrating an example of a processing configuration (processing module) of the server device 20 according to the first example embodiment. Referring to FIG. 7, the server device 20 includes a communication control unit 201, a user registration unit 202, a comparison unit 203, a user management unit 204, a locker management unit 205, and a storage unit 206.

The communication control unit 201 is a means that controls communication with other devices. Specifically, the communication control unit 201 receives data (packet) from the biometric authentication compatible locker 10. The communication control unit 201 transmits data to the biometric authentication compatible locker 10. The communication control unit 201 delivers data received from another device to another processing module. The communication control unit 201 transmits data acquired from another processing module to another device. In this manner, the another processing module transmits and receives data to and from other devices via the communication control unit 201.

Figure 8:
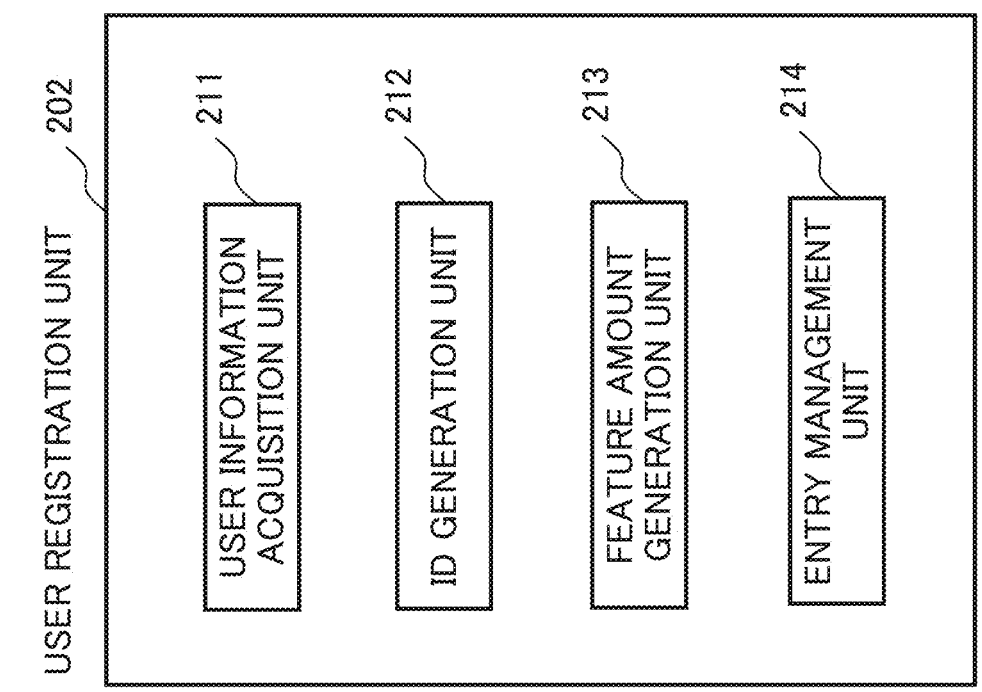
FIG. 8 is a diagram illustrating an example of a user registration unit according to the first example embodiment.

The user registration unit 202 is a means that achieves the system user registration described above. The user registration unit 202 includes a plurality of submodules. FIG. 8 is a diagram illustrating an example of a processing configuration of the user registration unit 202. Referring to FIG. 8, the user registration unit 202 includes a user information acquisition unit 211, an ID generation unit 212, a feature amount generation unit 213, and an entry management unit 214.

The user information acquisition unit 211 is a means that acquires the user information described above. The user information acquisition unit 211 acquires biological information and a profile of each of a plurality of users who use the locker management system. More specifically, the user information acquisition unit 211 acquires biological information (for example, a face image) and a profile (for example, name, affiliation, and the like) of the system user. The system user may input the information to the server device 20 from the user's terminal, or may operate the biometric authentication compatible locker 10 to input the information.

The user information acquisition unit 211 may provide a GUI or a form for inputting the information. For example, the user information acquisition unit 211 displays an information input form as illustrated in FIG. 9 on the terminal operated by the user.

The system user inputs the information illustrated in FIG. 9. The system user selects whether to newly register the user in the system or to update the already registered information. After inputting all the information, the system user presses a "transmit" button, and inputs the biological information and the profile to the server device 20.

The user information acquisition unit 211 stores the acquired user information in the storage unit 206.

The ID generation unit 212 is a means that generates an ID to be assigned to the system user. When the user information input by the system user is information related to new registration, the ID generation unit 212 generates an ID for identifying the new user. For example, the ID generation unit 212 may calculate a hash value of the acquired user information (face image, profile) and use the hash value as an ID to be assigned to the user. Alternatively, the ID generation unit 212 may assign a unique value each time user registration is performed and use the assigned value as the ID. In the following description, an ID (an ID for identifying a system user) generated by the ID generation unit 212 is referred to as a "user ID".

The feature amount generation unit 213 is a means that generates a feature amount (a feature vector including a plurality of feature amounts) characterizing the face image from the face image included in the user information. Specifically, the feature amount generation unit 213 extracts a feature point from the acquired face image. An existing technology can be used for the feature point extraction processing, and thus a detailed description thereof will be omitted. For example, the feature amount generation unit 213 extracts eyes, a nose, a mouth, and the like as feature points from the face image. Thereafter, the feature amount generation unit 213 calculates the position of each feature point and the distance between the feature points as a feature amount, and generates a feature vector (vector information characterizing the face image) including a plurality of feature amounts.

The entry management unit 214 is a means that manages an entry of the user database. When registering a new user in the database, the entry management unit 214 adds an entry including the user ID generated by the ID generation unit 212, the feature amount generated by the feature amount generation unit 213, the face image, and the profile acquired from the user to the user database.

When updating the information of the user already registered in the user database, the entry management unit 214 specifies an entry to be subjected to the information update based on an employee number or the like, and updates the user database using the acquired user information. At that time, the entry management unit 214 may update a difference between the acquired user information and the information registered in the database, or may overwrite each item of the database with the acquired user information. Similarly, regarding the feature amount, the entry management unit 214 may update the database when there is a difference in the generated feature amount, or may overwrite the existing feature amount with the newly generated feature amount.

The user registration unit 202 operates to construct a user database (database in which a user ID for identifying a system user, biological information, and a profile are stored in association with each other) as illustrated in FIG. 10. It goes without saying that the content registered in the user database illustrated in FIG. 10 is an example and is not intended to limit the information registered in the user database. The user database may store at least the user ID for identifying the user and the biological information in association with each other.

The description returns to FIG. 7. The comparison unit 203 is a means that performs the comparison process using biological information (face image). When acquiring the face image from the terminal 30 or the biometric authentication compatible locker 10, the comparison unit 203 executes the comparison process using the acquired image.

For example, the comparison unit 203 receives an authentication request from the entrance management terminal 30-1. Since the authentication request includes the face image of the visitor (person to be authenticated), the comparison unit 203 extracts the face image from the authentication request. The comparison unit 203 calculates a feature amount from the acquired face image.

The comparison unit 203 sets a feature amount calculated based on the face image acquired from entrance management terminal 30-1 as a comparison target, and performs the comparison process with the feature amount registered in the user database. More specifically, the comparison unit 203 sets the calculated feature amount (feature vector) as a comparison target, and executes one-to-N(N is a positive integer, and the same applies hereinafter) comparison with a plurality of feature vectors registered in the user database.

The comparison unit 203 calculates similarity between the feature amount of the comparison target and each of the plurality of feature amounts on the registration side. A chi-square distance, a Euclidean distance, or the like can be used as the similarity. The similarity is lower as the distance is longer, and the similarity is higher as the distance is shorter.

The comparison unit 203 specifies, from among the plurality of feature amounts registered in the user database, a feature amount having a similarity to the feature amount of the comparison target equal to or greater than a predetermined value and having the highest similarity. The comparison unit 203 refers to the user database and reads the user ID associated to the specified feature amount.

The comparison unit 203 delivers the read user ID to the user management unit 204. At that time, the comparison unit 203 notifies the user management unit 204 that the authentication request from the entrance management terminal 30-1 has been processed.

The comparison unit 203 also performs the same processing as described above on the face image (the face image of the exit person from the floor) acquired from the exit management terminal 30-2, and specifies the user ID associated to the face image. The comparison unit 203 delivers the specified user ID to the user management unit 204. At that time, the comparison unit 203 notifies the user management unit 204 that the authentication request from the exit management terminal 30-2 has been processed.

When the comparison process related to the face image acquired from the terminal 30 fails, the comparison unit 203 notifies the terminal 30 of the failure. The terminal 30 (the entrance management terminal 30-1, the exit management terminal 30-2) that has received the notification related to the authentication failure does not open the gate 31. The terminal 30 notifies the user that the authentication has failed, and prompts the user to take a measure such as contacting a predetermined contact address.

The comparison unit 203 also performs a similar process when receiving the locker unlocking request from the biometric authentication compatible locker 10. The comparison unit 203 refers to the user database and specifies the user ID associated to the biological information included in the locker unlocking request. Specifically, the comparison unit 203 extracts the face image from the request and executes the comparison process using the user database. The comparison unit 203 specifies the user ID of the corresponding person by the comparison process.

Thereafter, the comparison unit 203 confirms that the specified user ID is included in the entrance person management database. When the user ID is included in the database, the comparison unit 203 notifies the locker management unit 205 of the user ID specified as the request (storing and taking out baggage) of the user included in the locker unlocking request.

On the other hand, in a case where the user ID is not included in the entrance person management database, the comparison unit 203 notifies the biometric authentication compatible locker 10 of the authentication failure. By confirming that the user ID is included in the entrance person management database, the comparison unit 203 restricts the use of the locker to the user who has entered the floor through a proper procedure. The comparison unit 203 also notifies the biometric authentication compatible locker 10 of the authentication failure when the person of the face image included in the locker unlocking request is not registered in the user database. Upon receiving the notification related to the authentication failure, the biometric authentication compatible locker 10 notifies the user of the fact.

In the first example embodiment, a case where the user of the biometric authentication compatible locker 10 is limited to the entrance person at the free address floor will be described. Therefore, the server device 20 manages the entrance person in the floor by the entrance person management database, but in a case where the use of the locker is not limited to the entrance person, the entrance person may not be managed by the entrance person management database.

The user management unit 204 is a means that manages users (entrance person and visitors in the floor) in the free address floor. The user management unit 204 manages the entrance person using the user ID acquired from the comparison unit 203.

The user management unit 204 manages the user ID and the date and time when the user enters the floor in association with each other. Specifically, the user management unit 204 manages the entrance person using an entrance person management database having a field for storing at least the two pieces of information. For example, the user management unit 204 manages the entrance person using an entrance person management database as illustrated in FIG. 11.

When receiving the notification that "the authentication request from the entrance management terminal 30-1 is processed" from the comparison unit 203, the user management unit 204 adds the entry (the entry including the user ID and the entrance date and time) to the entrance person management table. When receiving the notification that "the authentication request from the exit management terminal 30-2 is processed" from the comparison unit 203, the user management unit 204 deletes the entry from the entrance person management table.

The entrance person management database illustrated in FIG. 11 is an example, and the state (work state) of the entrance person may be managed in addition to the entrance date and time. For example, the state of the entrance person may be set to "in a meeting" when the entrance person is in a meeting, and the state of the entrance person may be set to "normal working" when the entrance person is performing work on a round table or the like. Whether the entrance person is "in a meeting" may be determined by analyzing an image acquired from the camera device 40.

The description returns to FIG. 7. The locker management unit 205 is a means that manages each locker included in the biometric authentication compatible locker 10. The locker management unit 205 processes the "locker unlocking request" received from the biometric authentication compatible locker 10.

The locker management unit 205 uses the "locker management database" to manage each locker included in the biometric authentication compatible locker 10. The locker management database stores the locker ID, the attribute of the locker, and the usage status in association with each other (see FIGS. 12A and 12B).

The locker ID is an ID for specifying each locker included in the biometric authentication compatible locker 10. For example, the locker number is used as the locker ID. In FIG. 12, FIGS. 12A and 12B, the locker number illustrated in FIG. 3 is used as the locker ID.

The attribute field stores attribute information such as a feature of each locker. For example, the baggage storage capacity (the size of the locker) of each locker is used as the attribute value of the locker. Alternatively, the position of the locker may be used as the attribute value. In FIG. 12A, the size of each locker is set as the attribute value. In FIG. 12B, the position of each locker (relative position in the biometric authentication compatible locker 10) is set as the attribute value.

The usage status field stores a usage status (presence or absence of baggage; presence of baggage, absence of baggage) of each locker. If there is no baggage in the locker, nothing is set in the field, and if there is a baggage in the locker, a user ID associated to the user is set. The example of FIGS. 12A and 12B indicates that the locker of "R02" stores the baggage of the user to which "ID01" is assigned as the user ID.

It goes without saying that the description of FIG. 12-FIGS. 12A and 12B is an example and is not intended to limit the information stored in the locker management database. The locker management database may store at least the locker ID of the biometric authentication compatible locker 10 and the usage status of each locker in association with each other. Alternatively, the locker management database may store a plurality of attribute values (for example, the size and position of the locker).

In a case where the request of the user is "storage of baggage", the locker management unit 205 refers to the locker management database and selects an available locker. The locker management unit 205 sets the user ID (the user ID specified by the comparison process by the comparison unit 203) in the usage status field of the selected locker. The locker management unit 205 notifies the biometric authentication compatible locker 10 of the locker ID (locker number) of the selected locker, the request (storage of baggage) of the user, and the like.

When the request of the user is "taking out baggage", the locker management unit 205 refers to the locker management database, and specifies the locker ID in which the user ID acquired from the comparison unit 203 is set in the usage status field. The locker management unit 205 notifies the biometric authentication compatible locker 10 of the specified locker ID (locker number), the user's request (taking out baggage), and the like.

In a case where the user's request is "storage of baggage" and there is no empty biometric authentication compatible locker 10, the locker management unit 205 notifies an error in response to the locker unlocking request. When the request of the user is "taking out baggage" and the user ID specified by the comparison unit 203 is not set in the usage status field, the locker management unit 205 notifies an error in response to the locker unlocking request.

In a case where the biometric authentication compatible locker 10 stores the request (storing and taking out baggage) of the user set in the locker unlocking request, the locker management unit 205 does not need to notify the biometric authentication compatible locker 10 of the request. That is, the response transmitted from the server device 20 to the biometric authentication compatible locker 10 (response to the locker unlocking request) may not include the request of the user.

As described above, in a case where the request (request of the user) relating to the locker use is the storage of baggage, the locker management unit 205 selects a locker for storing the baggage. Further, the locker management unit 205 sets the specified user ID in the usage status field associated to the selected locker. The locker management unit 205 notifies the biometric authentication compatible locker 10 of the locker ID of the selected locker. When the request relating to the locker use is the taking out baggage, the locker management unit 205 refers to the locker management database and specifies the locker ID in which the specified user ID is set in the usage status field. The locker management unit 205 notifies the biometric authentication compatible locker 10 of the specified locker ID.

Upon receiving the "baggage presence/absence information" from the biometric authentication compatible locker 10, the locker management unit 205 extracts the locker ID and the information regarding the presence/absence of the baggage (baggage status) from the received information. When the baggage status is "no baggage", the locker management unit 205 sets "empty" in the corresponding usage status field of the locker ID.

When the baggage status is "baggage present", the locker management unit 205 confirms that the user ID is set in the corresponding usage status field of the locker ID. In a case where the baggage status is "baggage present" and the user ID is not set in the corresponding usage status field of the locker ID, the locker management unit 205 notifies the administrator or the like of the fact. Since such a situation cannot occur in normal operation, the administrator or the like checks the situation and takes appropriate measures.

By transmitting and receiving the "baggage presence/absence information" between the biometric authentication compatible locker 10 and the server device 20, it is possible to prevent a contradiction from occurring between the state of each locker and the locker management database. For example, there is a case where the user selects "storage of baggage" and opens the locker, but closes the locker without storing any baggage. In this case, when the biometric authentication compatible locker 10 is notified of the locker ID, the user ID is set in the usage status field. However, thereafter, since it is determined from the baggage presence/absence information that the locker is empty, the locker management unit 205 can set the usage status of the corresponding locker to "empty". That is, the locker management unit 205 updates the locker management database using the baggage presence/absence information, thereby preventing a contradiction from occurring between the state of the locker and the database.

The storage unit 206 is a means that stores information necessary for the operation of the server device 20.

[Biometric Authentication Compatible Locker]

FIG. 13 is a diagram illustrating an example of a processing configuration (processing module) of the biometric authentication compatible locker 10 according to the first example embodiment. Referring to FIG. 13, the biometric authentication compatible locker 10 includes a communication control unit 301, a user detection unit 302, a user request determination unit 303, a face image acquisition unit 304, an unlocking request unit 305, a locker control unit 306, and a storage unit 307.

The communication control unit 301 is a means that controls communication with other devices. Specifically, the communication control unit 301 receives data (packet) from the server device 20. The communication control unit 301 transmits data to the server device 20. The communication control unit 301 delivers data received from another device to another processing module. The communication control unit 301 transmits data acquired from another processing module to another device. In this manner, the another processing module transmits and receive data to and from other devices via the communication control unit 301.

The user detection unit 302 is a means that detects whether a user (locker user) exists in front of the own device. The user detection unit 302 detects the presence or absence of the user by an arbitrary means. For example, the user detection unit 302 controls the camera 12 and analyzes the acquired image to detect the user.

The user detection unit 302 controls the camera 12 to capture an image of the front of the own device periodically or at a predetermined timing. The user detection unit 302 determines whether a face image of a person is included in the acquired image, and sets "user present" in a case where the face image is included. Alternatively, the user detection unit 302 may detect the presence or absence of the user using a human sensor or the like. In a case where the user is detected, the user detection unit 302 notifies the user request determination unit 303 of the detection.

The user request determination unit 303 is a means that determines a request (request relating to the locker use; for example, storing and taking out baggage) of the locker user. Upon receiving the notification of "user present" from the user detection unit 302, the user request determination unit 303 generates a GUI as illustrated in FIG. 4, for example. The user request determination unit 303 delivers the request (storing and taking out baggage) acquired by the GUI to the face image acquisition unit 304.

The face image acquisition unit 304 is a means that controls the camera 12 and acquires a face image (biological information) of a visitor in front. When acquiring the request of the user from the user request determination unit 303, the face image acquisition unit 304 images the user in front. The face image acquisition unit 304 extracts a face image from the image data. The face image acquisition unit 304 notifies the unlocking request unit 305 of the face image and the user's request (storing and taking out baggage). The face image acquisition unit 304 desirably performs display as illustrated in FIG. 5 in such a way that the user can recognize that the face image is acquired.

Since an existing technology can be used for the face image detection processing and the face image extraction processing by the user detection unit 302 and the face image acquisition unit 304, detailed description thereof will be omitted. For example, the face image acquisition unit 304 or the like may extract a face image (face area) from the image data by using a learning model learned by a convolutional neural network (CNN). Alternatively, the face image acquisition unit 304 or the like may extract the face image using a method such as template matching.

The unlocking request unit 305 is a means that requests the server device 20 to notify the locker ID to be unlocked. The unlocking request unit 305 transmits a user's request (storing and taking out baggage) and a "locker unlocking request" including the user's face image to the server device 20.

The unlocking request unit 305 receives a response (request of user, response including a locker ID of the locker to be unlocked) to the request from the server device 20. The unlocking request unit 305 delivers the acquired response to the locker control unit 306.

The locker control unit 306 is a means that controls and manages the locker included in the biometric authentication compatible locker 10. The locker control unit 306 controls unlocking and locking of each locker. For example, an electromagnetic lock is attached to each locker, and the locker control unit 306 controls unlocking and locking of each locker by controlling energization of the electromagnetic lock.

For example, a weight sensor is attached to each locker. The locker control unit 306 can determine whether a baggage is stored in each locker on the basis of the output of the weight sensor. Any means can be used as a method of determining the presence or absence of baggage by the locker control unit 306. For example, a small camera may be installed in each locker, and the locker control unit 306 may determine the presence or absence of baggage by analyzing an image obtained from the camera.

The locker control unit 306 unlocks the locker on the basis of the response acquired from the server device 20. Specifically, the locker control unit 306 unlocks the locker associated to the locker ID acquired from the unlocking request unit 305. At that time, the locker control unit 306 performs display according to a request (storing and taking out baggage) of the user. For example, the locker control unit 306 performs display as illustrated in FIGS. 6A and 6B.

The locker control unit 306 detects that the user has closed the locker by an arbitrary method. For example, the locker control unit 306 detects that the locker is closed using a contact sensor or the like.

When the locker is closed, the locker control unit 306 checks the state of the locker (presence or absence of baggage). The locker control unit 306 generates "baggage presence/absence information" including information regarding the presence/absence of baggage (baggage status), and transmits the baggage presence/absence information to the server device 20. Specifically, if there is no baggage in the closed locker, the locker control unit 306 sets "No baggage; absence of baggage" in the baggage status, and transmits the baggage presence/absence information including the locker ID and the baggage status to the server device 20. If there is a baggage in the closed locker, the locker control unit 306 sets "baggage present; presence of baggage" in the baggage status, and transmits the baggage presence/absence information including the locker ID and the baggage status to the server device 20.

The storage unit 307 is a means that stores information necessary for the operation of the biometric authentication compatible locker 10.

[Entrance Management Terminal]

Figure 14:
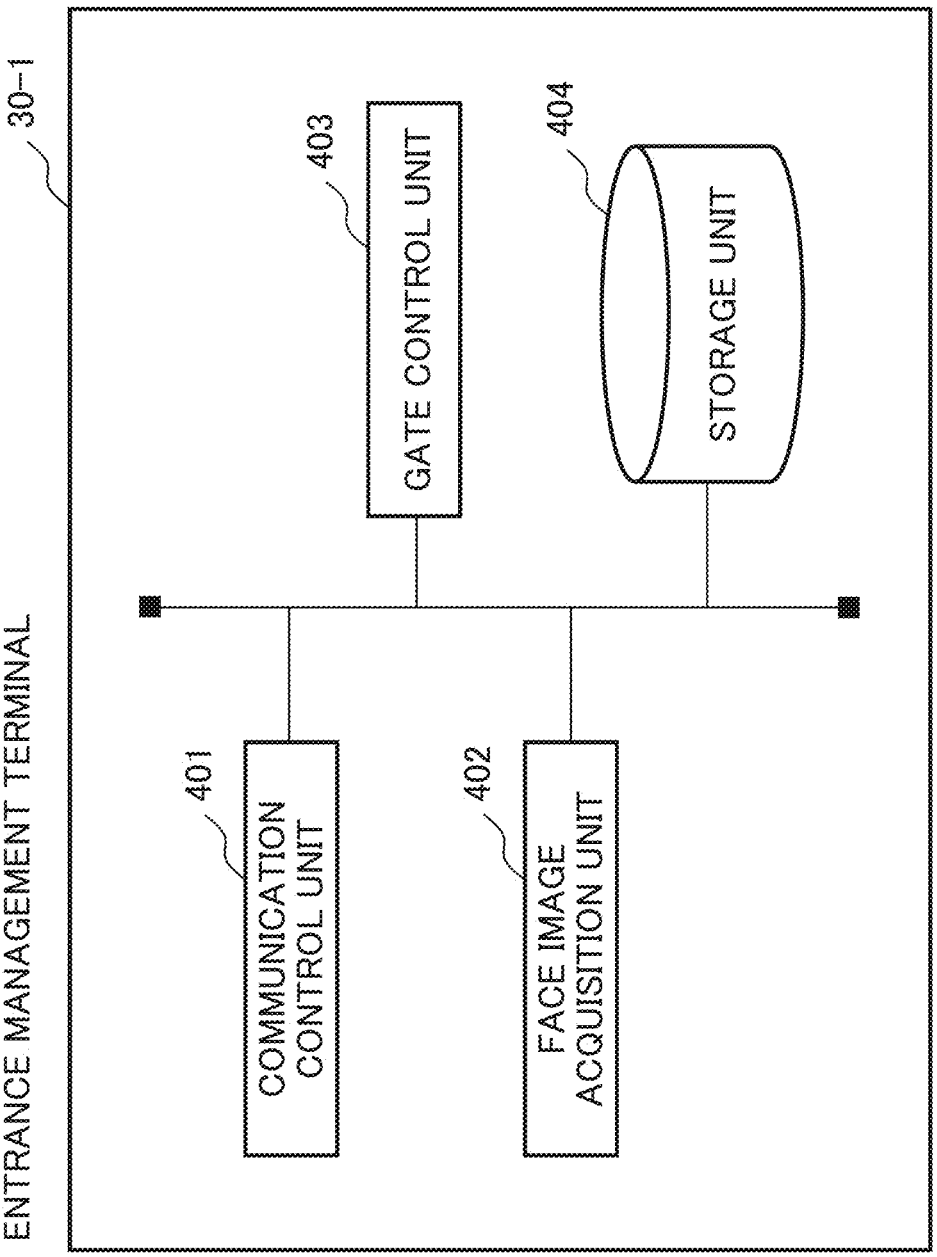
FIG. 14 is a diagram illustrating an example of a processing configuration of an entrance management terminal according to the first example embodiment.

FIG. 14 is a diagram illustrating an example of a processing configuration (processing module) of the entrance management terminal 30-1. Referring to FIG. 14, the entrance management terminal 30-1 includes a communication control unit 401, a face image acquisition unit 402, a gate control unit 403, and a storage unit 404.

The basic functions and operations of the communication control unit 401, the face image acquisition unit 402, and the storage unit 404 of the entrance management terminal 30-1 can be the same as those of the corresponding processing module of the biometric authentication compatible locker 10, and thus detailed description thereof is omitted. The gate control unit 403 is a means that controls opening and closing of the gate 31 according to the authentication result from the server device 20.

A processing configuration (processing module) of the exit management terminal 30-2 can be the same as that of the entrance management terminal 30-1, and thus the description corresponding to FIG. 14 is omitted.

[Operation of Locker Management System]

Next, an operation of the locker management system according to the first example embodiment will be described.

Figure 15:
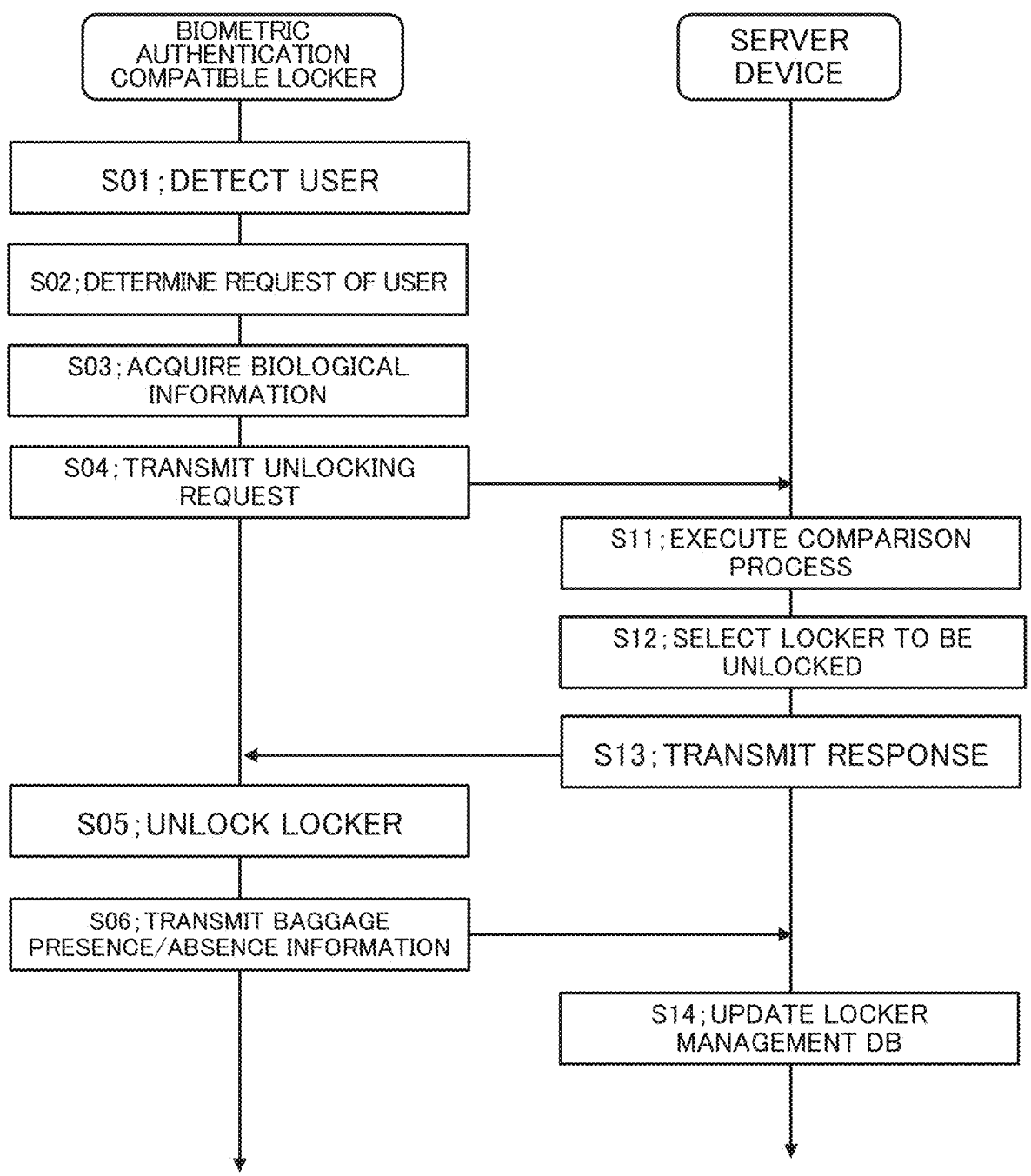
FIG. 15 is a sequence diagram illustrating an example of an operation of the locker management system according to the first example embodiment.

FIG. 15 is a sequence diagram illustrating an example of the operation of the locker management system according to the first example embodiment. FIG. 15 is a sequence diagram illustrating an example of a system operation in a case where the biometric authentication compatible locker 10 is used. It is assumed that the system user is registered in advance prior to the operation of FIG. 15.

The biometric authentication compatible locker 10 detects a user (Step S01).

When detecting the presence of a user, the biometric authentication compatible locker 10 determines the request of the user (storing and taking out baggage) (Step S02).

The biometric authentication compatible locker 10 acquires biological information (face image) of the user (Step S03).

The biometric authentication compatible locker 10 transmits a locker unlocking request including the request of the user and the biological information to the server device 20 (transmit the unlocking request; Step S04).

The server device 20 extracts the biological information from the locker unlocking request, and executes the comparison process using the extracted biological information (Step S11).

The server device 20 uses the user ID, the locker management database, and the request of the user (storing and taking out baggage) specified by the comparison process to select the locker to be unlocked (Step S12).

The server device 20 transmits a response including the locker ID of the selected locker and the request of the user to the biometric authentication compatible locker 10 (Step S13).

The biometric authentication compatible locker 10 extracts the locker ID from the acquired response, and unlocks the locker associated to the locker ID (Step S05).

When detecting that the unlocked locker is closed, the biometric authentication compatible locker 10 confirms the presence or absence of baggage in the locker, and transmits baggage presence/absence information to the server device 20 (Step S06).

The server device 20 updates the locker management database on the basis of the baggage presence/absence information (Step S14).

As described above, the biometric authentication compatible locker 10 according to the first example embodiment acquires the face image of the locker user, and transmits the user's request (storing and taking out baggage) and the face image to the server device 20 as the locker unlocking request. The server device 20 specifies the locker user by the comparison process using the biological information included in the locker unlocking request, and specifies the locker to be unlocked based on the request of the user included in the locker unlocking request. The server device 20 includes the locker ID of the specified locker in a response to the locker unlocking request, and transmits the response to the biometric authentication compatible locker 10. The biometric authentication compatible locker 10 unlocks the locker associated to the acquired locker ID. As described above, since the locker management system according to the first example embodiment unlocks the locker by the biometric authentication of the user, the usefulness of the locker user is improved. This is because the locker user does not need to input a fee (coin) required in the existing locker system, lock the locker by a physical key, or the like each time the user temporarily leaves the free address floor.

Second Example Embodiment

Next, a second example embodiment will be described in detail with reference to the drawings.

In the first example embodiment, a case where the biometric authentication compatible locker 10 acquires the request (storing and taking out baggage) of the user has been described. When the method described in the first example embodiment (the method of acquiring the request of the user) is adopted, the user needs to touch the display panel 11 of the biometric authentication compatible locker 10. In a case where the user intends to store a small baggage in the locker, information can be input into the biometric authentication compatible locker 10 with one hand. However, in a case where it is considered to store a large baggage in the locker, both hands of the user are often used. In such a case, it is difficult for the user to input information into the biometric authentication compatible locker 10.

In the second example embodiment, a case where the user does not directly touch the display panel 11 of the biometric authentication compatible locker 10 and the system determines the user's request (storing and taking out baggage) will be described.

Since the configuration of the locker management system according to the second example embodiment can be the same as that of the first example embodiment, the description corresponding to FIG. 2 is omitted. Since the processing configuration of the biometric authentication compatible locker 10, the server device 20, and the like according to the second example embodiment can also be the same as that of the first example embodiment, the description thereof will be omitted. Hereinafter, differences between the first and second example embodiments will be mainly described.

The user request determination unit 303 according to the second example embodiment determines the request relating to the locker use on the basis of the action by the locker user (characteristic action by the user determined in advance by the system). For example, the user request determination unit 303 determines the request of the user (storing and taking out baggage) by analyzing a face image obtained by imaging the user in front.

Figure 16:
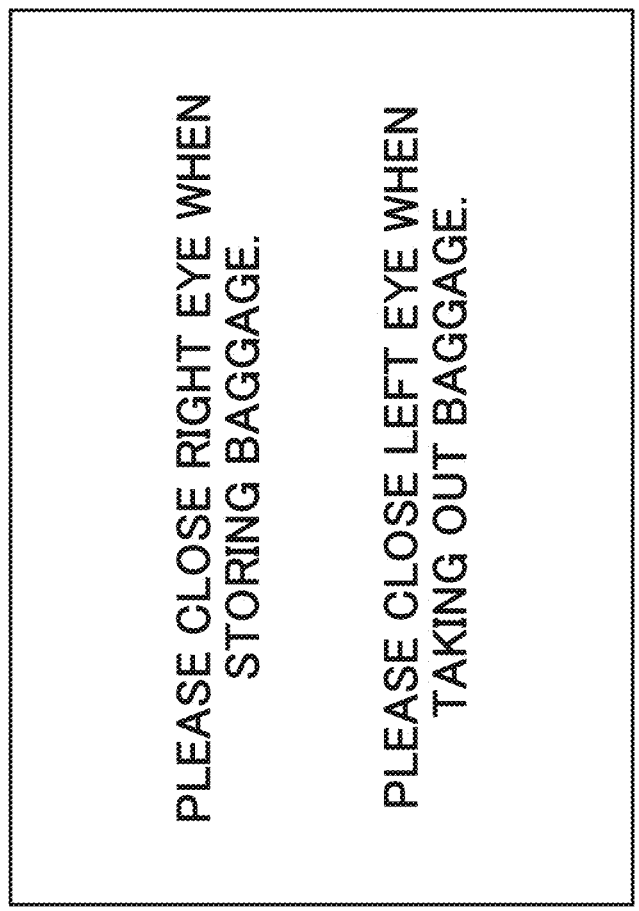
FIG. 16 is a diagram for explaining an operation of a user request determination unit according to a second example embodiment.

The user request determination unit 303 determines the request of the user on the basis of the change related to the face of the locker user. For example, the user request determination unit 303 determines the request of the user according to the eyes closed by the user. For example, the user request determination unit 303 makes a determination such as "storage of baggage" if the right eye is closed and "taking out baggage" if the left eye is closed. At this time, the user request determination unit 303 performs display as illustrated in FIG. 16, for example.

The user request determination unit 303 controls the camera 12 to image the user. The user request determination unit 303 analyzes the obtained image and determines which eye the user closes. The user request determination unit 303 makes the determination using, for example, a template or the like, and acquires a request (storing and taking out baggage) of the user.

Alternatively, the user request determination unit 303 may determine the request (storing and taking out baggage) of the user according to the face direction (right direction, left direction; up, down) of the user.

Modification According to Second Example Embodiment

The user request determination unit 303 may determine the request (storing and taking out baggage) on the basis of a larger action of the user. For example, the user request determination unit 303 may determine the request of the user (storing and taking out baggage) on the basis of the direction in which the user walks toward the own device.

The user request determination unit 303 analyzes the image obtained from the camera 12 and calculates a trajectory when the user moves. Specifically, the user request determination unit 303 extracts a plurality of face images related to the same person from a moving image or a plurality of still images. The user request determination unit 303 extracts an image related to the same person from each of a plurality of frame images forming a moving image using a known image processing algorithm for tracking the same object (person) over different frames. The user request determination unit 303 specifies the extracted moving direction of the same person from a change in position in the image. The user request determination unit 303 determines the request (storing and taking out baggage) of the user on the basis of the specified moving direction.

Figure 17:
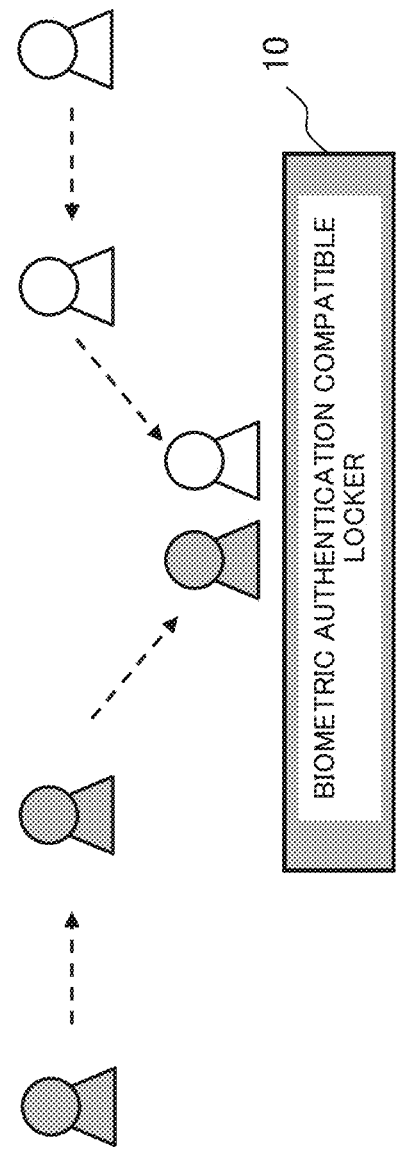
FIG. 17 is a diagram for explaining an operation of the user request determination unit according to the second example embodiment.

For example, as illustrated in FIG. 17, in a case where the user moves from the right side of the biometric authentication compatible locker 10, the user request determination unit 303 determines the request of the user as "storage of baggage". On the other hand, in a case where the user moves from the left side of the biometric authentication compatible locker 10, the user request determination unit 303 determines that the request of the user is "taking out baggage".

The correspondence relationship between the moving direction of the user and the request (storing and taking out baggage) may be determined according to the positional relationship between the biometric authentication compatible locker 10 and other components (floor components; for example, doorways, desks, conference rooms, and the like). For example, in the case of moving from the direction of the desk, it is assumed that baggage is stored in many cases, and thus the moving direction is determined as "storage of baggage". On the other hand, in a case where the user has moved from the doorway, it is assumed that the baggage stored in the biometric authentication compatible locker 10 is often taken out, and thus, the moving direction is determined as "taking out baggage".

In a case where the request of the user (storing and taking out baggage) is automatically determined depending on the moving direction, it is desirable to provide a mechanism by which the user can correct the automatically determined result.

The determination regarding the moving direction of the user may be performed by the server device 20. The server device 20 analyzes an image obtained from the camera device 40 that looks down the entire floor to calculate movement related to a user in the floor in real time. When the server device 20 grasps the user moving to the biometric authentication compatible locker 10 among the users moving in the floor, the server device notifies the biometric authentication compatible locker 10 of the moving direction of the user. The biometric authentication compatible locker 10 acquires a request (storing and taking out baggage) of the user on the basis of the notification.

As described above, the biometric authentication compatible locker 10 according to the second example embodiment estimates the request of the user (storing and taking out baggage) on the basis of the action of the user (characteristic action of the user). As a result, the user holding a large baggage can transmit his/her request to the biometric authentication compatible locker 10 without touching the locker. Therefore, the usefulness of the biometric authentication compatible locker 10 is further improved.

Third Example Embodiment

Next, a third example embodiment will be described in detail with reference to the drawings.

In the first example embodiment, the case where the server device 20 selects any available locker has been described. In the third example embodiment, a case where the server device 20 selects a locker suitable for the user from among a plurality of available lockers will be described. The third example embodiment is a mode in which a locker for storing baggage is selected from among available lockers. Therefore, in the third example embodiment, a case where the request of the user is "storage of baggage" will be described.

Since the configuration of the locker management system according to the third example embodiment can be the same as that of the first example embodiment, the description corresponding to FIG. 2 is omitted. Since the processing configuration of the server device 20 and the like according to the third example embodiment can also be the same as that of the first example embodiment, the description thereof will be omitted. Hereinafter, differences in the first to third example embodiments will be mainly described.

When transmitting the locker unlocking request, the biometric authentication compatible locker 10 according to the third example embodiment includes accompanying information regarding the user in the request. Examples of the accompanying information included in the locker unlocking request include information regarding the user's height and the user's baggage.

Figure 18:
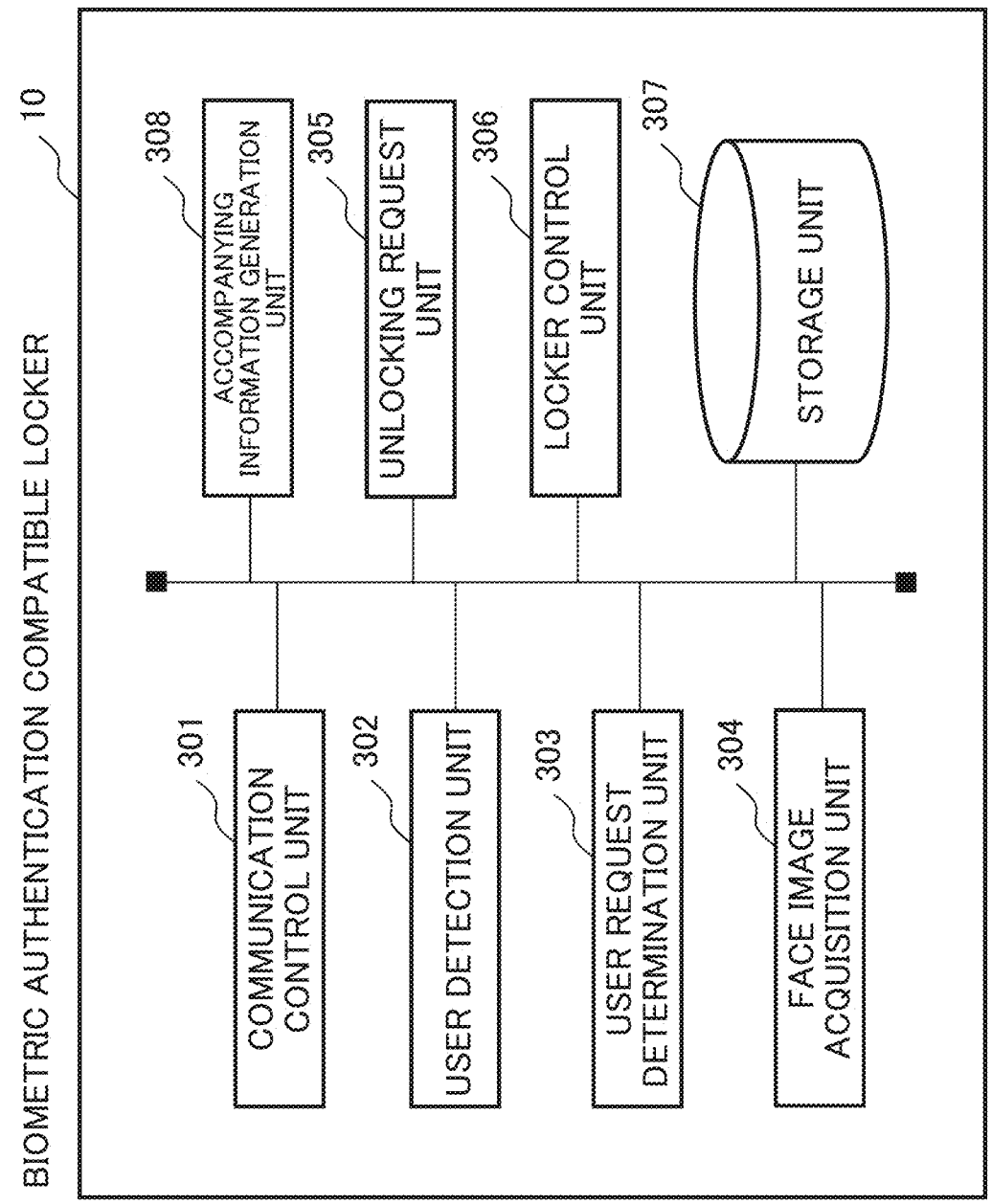
FIG. 18 is a diagram illustrating an example of a processing configuration of the biometric authentication compatible locker according to a third example embodiment.

FIG. 18 is a diagram illustrating an example of a processing configuration (processing module) of the biometric authentication compatible locker 10 according to the third example embodiment. Referring to FIG. 18, an accompanying information generation unit 308 is added to the configuration of the biometric authentication compatible locker 10 according to the first example embodiment.

The accompanying information generation unit 308 generates accompanying information regarding the user (locker user). For example, the accompanying information generation unit 308 generates "information regarding the height of the user" as the accompanying information. The accompanying information generation unit 308 estimates the user's height using an arbitrary method. For example, the accompanying information generation unit 308 may estimate the height of the user by analyzing the image obtained from the camera 12. In this case, the accompanying information generation unit 308 estimates the height of the user according to the position of the face area in the entire image data. Specifically, if the face area is included in the upper area of the image data, the accompanying information generation unit 308 estimates that the user is "tall stature". On the other hand, when the face area is included in the lower area of the image data, the accompanying information generation unit 308 estimates that the user is "short stature".

Alternatively, a plurality of distance sensors may be arranged in the vertical direction at predetermined intervals, and the plurality of distance sensors may be used to estimate (measure) the height. That is, the accompanying information generation unit 308 may estimate the height on the basis of the output of the distance sensor. The accompanying information generation unit 308 monitors the output of each of the plurality of sensors and measures the height of the user from the difference in the output value of each sensor. If the user's height is low, the number of sensors that react to the user is small, and if the user's height is high, the number of sensors that react to the user is large. The accompanying information generation unit 308 estimates the height of the user according to the output change of the sensor caused by the difference in the height of the user.

The accompanying information generation unit 308 delivers the information regarding the height of the user to the unlocking request unit 305.

The unlocking request unit 305 transmits a locker unlocking request including accompanying information to the server device 20.

The locker management unit 205 of the server device 20 refers to accompanying information included in the locker unlocking request, and selects a locker to be provided to the user. At that time, the locker management unit 205 selects a locker with reference to the attribute field and the accompanying information of the locker management database.

Specifically, the locker management unit 205 selects the locker on the basis of the information regarding the height of the user. For example, if the user is estimated to be tall, the locker management unit 205 preferentially selects the locker located at the upper stage among the empty lockers. In the example of FIG. 12B, the locker with the locker ID "R01" or "R04" is preferentially selected.

Modification According to Third Example Embodiment

The biometric authentication compatible locker 10 may select the locker according to the size of the baggage that the user intends to store in the locker.

The accompanying information generation unit 308 analyzes the image showing the user and the baggage and estimates the size of the baggage. For example, the accompanying information generation unit 308 estimates the size of the baggage by a method such as template matching. The accompanying information generation unit 308 may estimate the size of the baggage using a learning model generated by machine learning such as artificial intelligence (AI).

The biometric authentication compatible locker 10 transmits a locker unlocking request including information regarding the size of the baggage (information regarding the size of the baggage owned by the user) as accompanying information to the server device 20.

The locker management unit 205 refers to the locker management database and selects a locker suitable for the stored size of the baggage. For example, in a case where accompanying information indicating that the size of the baggage is "small" has been acquired, the locker management unit 205 preferentially selects a locker having an attribute value of "small size" from among empty lockers. In the example of FIG. 12A, the locker with the locker ID "R01" or "R04" is preferentially selected.

The biometric authentication compatible locker 10 may provide the user with an interface that enables information input regarding the size of the baggage. That is, the server device 20 may select the locker on the basis of the accompanying information generated by the user's self-report (report regarding the size of the baggage).

The server device 20 selects the locker only when the user's request is "storage of baggage". Therefore, it is sufficient for the accompanying information generation unit 308 to generate the accompanying information only when the request of the user is "storage of baggage".

As described above, the biometric authentication compatible locker 10 according to the third example embodiment generates accompanying information of the user and transmits the accompanying information to the server device 20. The server device 20 grasps the situation, features, and the like of the locker user using the received accompanying information as a clue, and selects a locker suitable for the locker user. The biometric authentication compatible locker 10 unlocks the locker (the locker selected by the server device 20 using the accompanying information).

As a result, the usefulness of the biometric authentication compatible locker 10 is further improved.

Fourth Example Embodiment

Next, a fourth example embodiment will be described in detail with reference to the drawings.

In the fourth example embodiment, a description will be given of a case where, when an entrance person leaves the free address floor, in a case where a baggage remains stored in the biometric authentication compatible locker 10, the fact is notified to the user.

Since the configuration of the locker management system according to the fourth example embodiment can be the same as that of the first example embodiment, the description corresponding to FIG. 2 is omitted. Since the processing configuration of the biometric authentication compatible locker 10, the server device 20, and the like according to the fourth example embodiment can also be the same as that of the first example embodiment, the description thereof will be omitted. Hereinafter, differences in the first to fourth example embodiments will be mainly described.

When acquiring the authentication request from the exit management terminal 30-2, the user management unit 204 of the server device 20 determines whether the user ID specified by the authentication is registered in the locker management database.

In a case where the user ID is registered in the locker management database, the user management unit 204 notifies the exit management terminal 30-2 of the fact.

Figure 19:
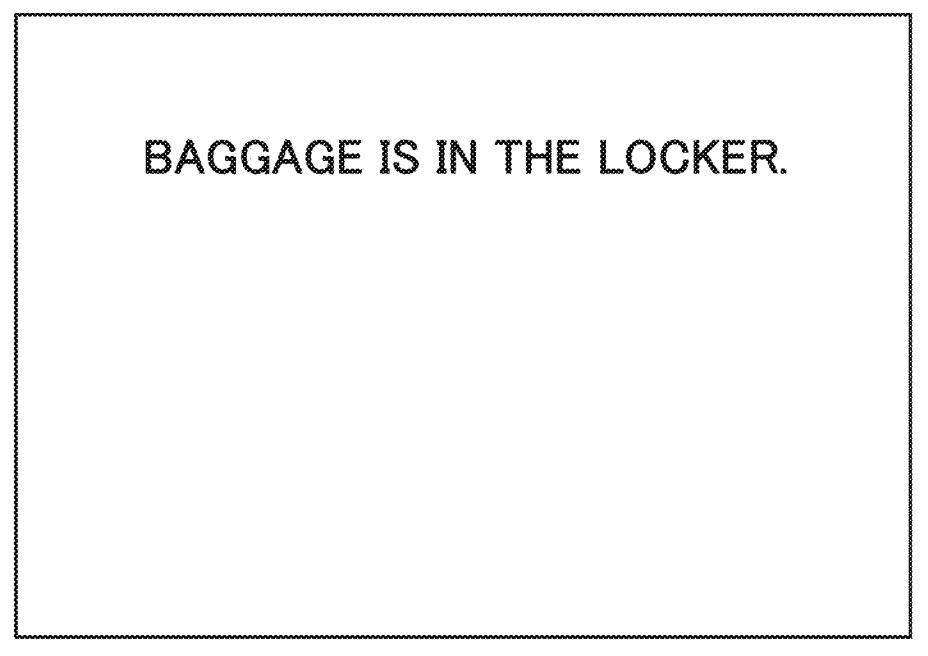

The gate control unit 403 of the exit management terminal 30-2 that has received the notification notifies the exit person that the baggage is present in the locker before opening gate 31. For example, the gate control unit 403 performs a display as illustrated in FIG. 19 and notifies the exit person of the presence of the baggage stored in the locker.

In the case of temporary leaving from the floor, the exit person ignores the notification and exits from the floor. In a case where the exit person determines that the baggage has been mislaid in the biometric authentication compatible locker 10, the exit person returns to the biometric authentication compatible locker 10 and takes out the baggage.

Figure 20:
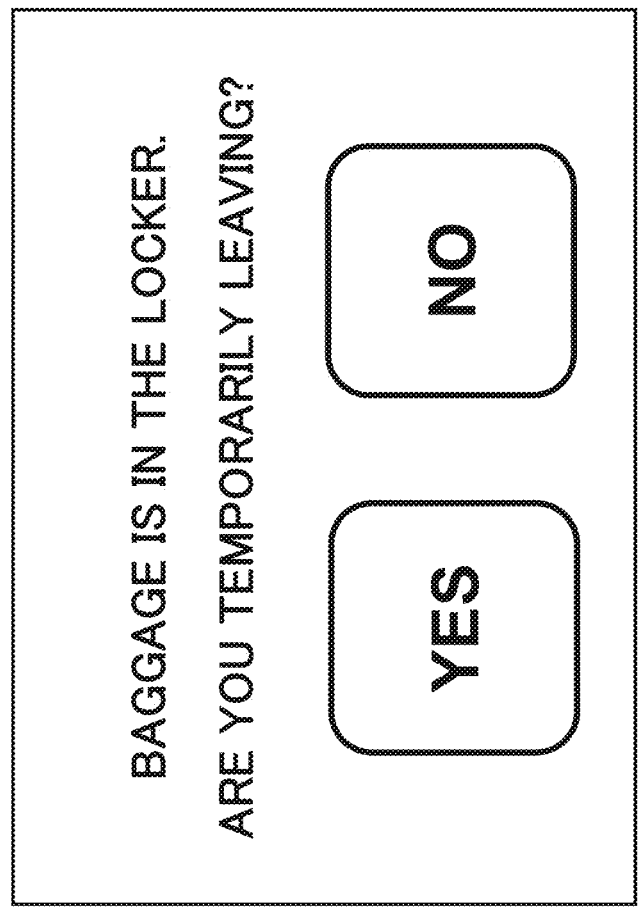
FIG. 20 is a diagram for explaining an operation of the gate control unit according to the fourth example embodiment.

Alternatively, the exit management terminal 30-2 may display a GUI for confirming the intention of the user, and may control opening and closing of the gate 31 based on information obtained from the GUI. For example, the gate control unit 403 performs display as illustrated in FIG. 20. When the user selects the temporary exit, the gate control unit 403 opens the gate 31.

As described above, the locker management system according to the fourth example embodiment utilizes the exit management terminal 30-2 that controls the gate that restricts the exit of the user. The exit management terminal 30-2 transmits the biological information of the exit person (the exit person from the floor) to the server device 20. The server device 20 specifies the user ID of the exit person by the comparison process using the biological information of the exit person. In a case where the user ID of the specified exit person is set in the usage status field, the server device 20 notifies the exit management terminal 30-2 about the mislaying of the baggage. As a result, the exit person does not return home (unintentionally return home) with his/her baggage stored in the locker. Therefore, the usefulness of the locker management system is further improved.

Fifth Example Embodiment

Next, a fifth example embodiment will be described in detail with reference to the drawings.

In the fifth example embodiment, a case where equipment is stored in a locker of the biometric authentication compatible locker 10 will be described.

Since the configuration of the locker management system according to the fifth example embodiment can be the same as that of the first example embodiment, the description corresponding to FIG. 2 is omitted. Since the processing configuration of the biometric authentication compatible locker 10 and the like according to the fifth example embodiment can be the same as that of the first example embodiment, the description thereof will be omitted. Hereinafter, differences in the first to fifth example embodiments will be mainly described.

Figure 21:
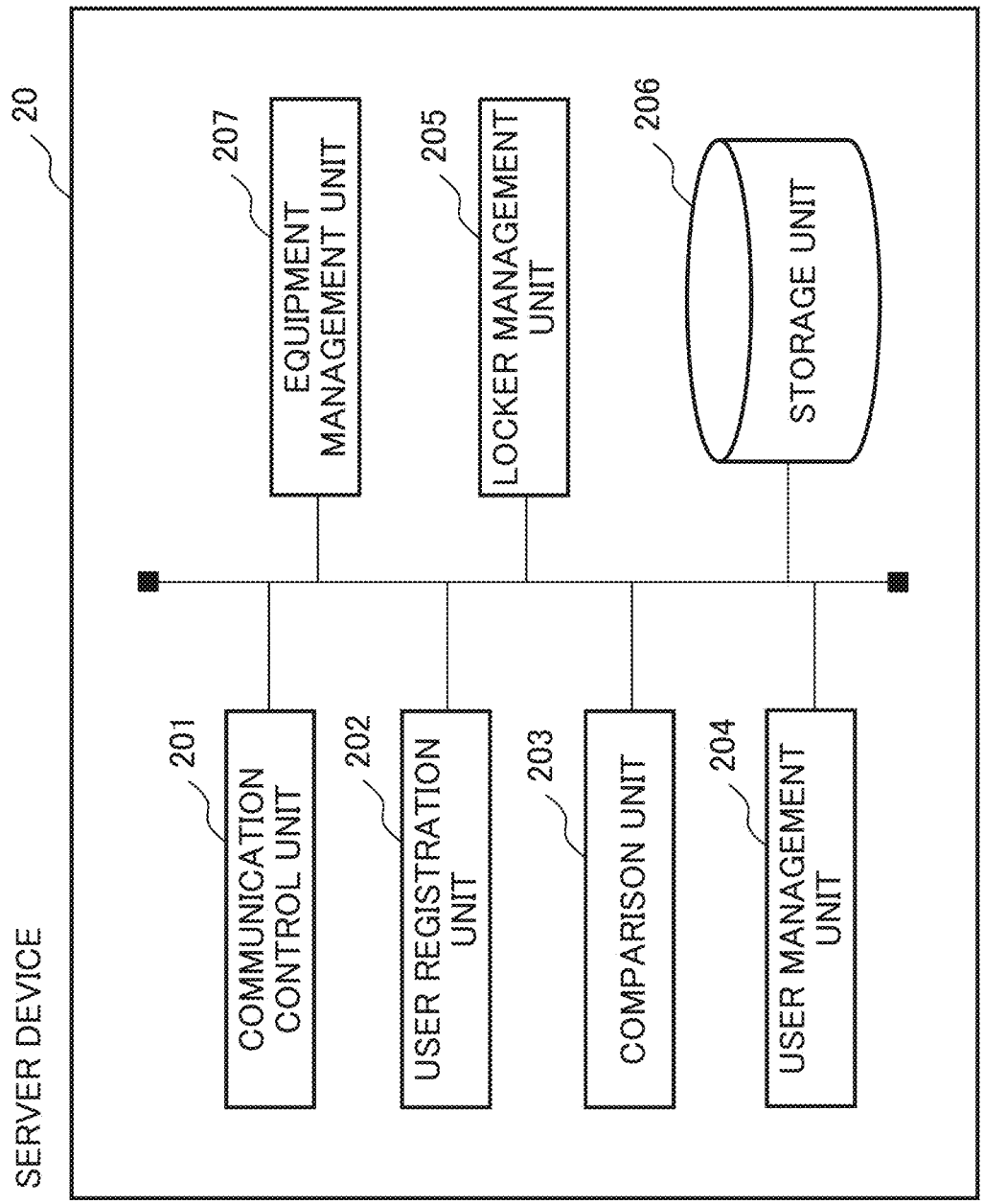
FIG. 21 is a diagram illustrating an example of a processing configuration of a server device according to a fifth example embodiment.

FIG. 21 is a diagram illustrating an example of a processing configuration (processing module) of the server device 20 according to the fifth example embodiment. Referring to FIG. 21, an equipment management unit 207 is added to the configuration of the server device 20 according to the first example embodiment.

The equipment management unit 207 is a means that manages the equipment stored in the locker. The equipment management unit 207 acquires reservation information regarding the use of equipment by any means. For example, the equipment management unit 207 displays an information input form as illustrated in FIG. 22 on a terminal operated by the user.

The equipment subscriber inputs the information illustrated in FIG. 22. The equipment management unit 207 updates the equipment management database based on the information (equipment reservation information) acquired from the subscriber. Specifically, the equipment management unit 207 searches the user database using the name of the subscriber and the employee number as keys, and specifies the corresponding user ID. The equipment management unit 207 adds an entry including the specified user ID, belonging department, equipment (reserved equipment), and usage period to the equipment management database. For example, an equipment management database as illustrated in FIG. 23 is constructed.

The locker management database according to the fifth example embodiment stores a locker in which equipment is stored. For example, as illustrated in FIG. 24, the equipment and a locker ID of a locker in which the equipment is stored are stored in the locker management database in association with each other.

The equipment management unit 207 checks the equipment management database periodically or at a predetermined timing. More specifically, the equipment management unit 207 checks the usage period field of the database, and specifies a reservation (entry) whose usage period is approaching. For example, the equipment management unit 207 specifies an entry whose usage period starts after a predetermined time elapses (for example, after 5 minutes). The equipment management unit 207 sets the ID of the subscriber in the usage status field (field of the locker management database) of the locker that stores the equipment of the specified entry. For example, in the example of FIG. 23, when the use start time of the equipment "B01" approaches, "ID 21" that is the user ID of the subscriber is set in the usage status field of the locker storing the equipment "B01" (see the first line of FIG. 24).

When the request of the user is "storage of baggage", the locker management unit 205 does not select a locker in which equipment is stored, but selects a locker in which no equipment is stored. In the example of FIG. 24, a locker with a locker ID "R04" is selected.

When the request of the user is "taking out baggage", the locker management unit 205 specifies the locker to be notified to the biometric authentication compatible locker 10, similarly to the first example embodiment. Specifically, the locker management unit 205 specifies the usage status field in which the user ID specified by the comparison process is stored, and notifies (responds to) the biometric authentication compatible locker 10 of the corresponding locker ID. Therefore, when the subscriber inputs an operation related to "taking out baggage" to the biometric authentication compatible locker 10, the locker in which the equipment is stored opens.

When the usage period of the reservation information has elapsed, the locker management unit 205 deletes the user ID set in the usage status field. Even if the subscriber tries to use the equipment after the usage period elapses, the user ID of the user is deleted, and thus, the locker storing the equipment is not opened.

Figure 25:
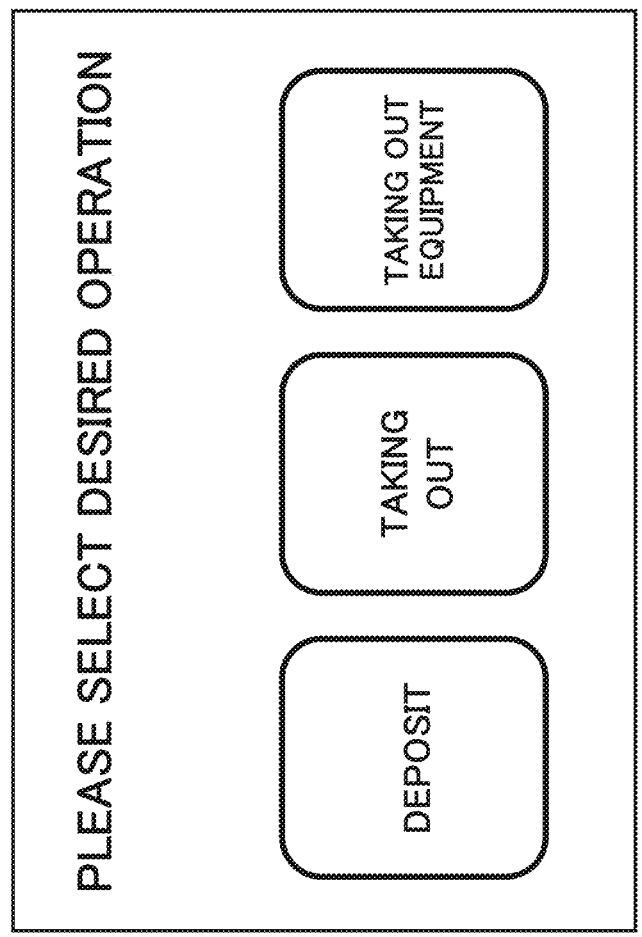
FIG. 25 is a diagram for explaining an operation of a user request determination unit according to the fifth example embodiment.

The biometric authentication compatible locker 10 may provide the user with an interface that distinguishes between normal taking out baggage and taking out reserved equipment. For example, the user request determination unit 303 may acquire the request of the user (storing, taking out, and taking out equipment) using the interface as illustrated in FIG. 25.

The request is transmitted to the server device 20. The locker management unit 205 of the server device 20 may specify a locker to be unlocked according to a request (taking out, and taking out equipment) of the user. For example, in a case where the subscriber has reserved the equipment and stored his/her baggage in the locker, the specification of the locker by the request is effective. Specifically, in a case where the same user ID is set in the usage status field of the locker management database, a locker that does not store equipment is unlocked in the case of normal "taking out baggage". On the other hand, if the request acquired from the biometric authentication compatible locker 10 is "taking out equipment", the locker in which the equipment is stored is unlocked.

Modification According to Fifth Example Embodiment

In the fifth example embodiment, a case where the subscriber inputs the "equipment reservation information" to the server device 20 has been described. In a modification according to the fifth example embodiment, a case where the server device 20 manages a user (equipment borrower) who takes out equipment from a locker will be described.

In the fifth example embodiment, it is assumed that the locker storing the equipment is not locked.

When a locker housing equipment is opened, the face image acquisition unit 304 of the biometric authentication compatible locker 10 acquires a face image of a person who has opened the locker. The face image acquisition unit 304 delivers the acquired face image to the locker control unit 306.

The locker control unit 306 transmits, to the server device 20, an "equipment management request" including the locker ID of the locker opened by the equipment borrower and the acquired face image.

The comparison unit 203 of the server device 20 receives the equipment management request and executes the comparison process using the acquired face image. The comparison unit 203 specifies the user ID of the equipment borrower specified by the comparison process, and delivers the locker ID included in the equipment management request to the equipment management unit 207.

The equipment management unit 207 searches the locker management database using the locker ID as a key, and specifies the equipment accommodated in the locker opened by the equipment borrower. The equipment management unit 207 manages the specified equipment and the user ID of the equipment borrower in association with each other. For example, the equipment management unit 207 manages equipment renting using an equipment renting database that stores equipment and a user ID.

As described above, in the modification according to the fifth example embodiment, it is possible to specify the user who takes out the equipment from the image captured by the camera 12 and manage the renting of the equipment by the renting table (equipment renting database).

As described above, the server device 20 according to the fifth example embodiment includes the equipment management unit 207 that manages the equipment stored in the biometric authentication compatible locker 10, and the equipment management database. The equipment management database stores the user ID of the user who has reserved the equipment, the reserved equipment, and the usage period of the reserved equipment in association with each other. Before the usage period of the reserved equipment arrives, the equipment management unit 207 sets the user ID of the user who has reserved the equipment in the usage status field of the locker that stores the reserved equipment. In this manner, since the locker user can rent equipment by the operation described in the first example embodiment, the usefulness of the locker management system is improved.

In the locker management system according to the fifth example embodiment, the unlocking of the locker is controlled in conjunction with the usage period of the equipment, and thus, it is possible to prevent the equipment from being used outside the reserved time.

Sixth Example Embodiment

Next, a sixth example embodiment will be described in detail with reference to the drawings.

In the sixth example embodiment, a case where a user (hereinafter, it is described as a baggage storage person) who stores baggage and a user (denoted as a baggage taker) who takes out baggage are different will be described.

Since the configuration of the locker management system according to the sixth example embodiment can be the same as that of the first example embodiment, the description corresponding to FIG. 2 is omitted. Since the processing configuration of the biometric authentication compatible locker 10, the server device 20, and the like according to the sixth example embodiment can also be the same as that of the first example embodiment, the description thereof will be omitted. Hereinafter, differences in the first to sixth example embodiments will be mainly described.

Figure 26:
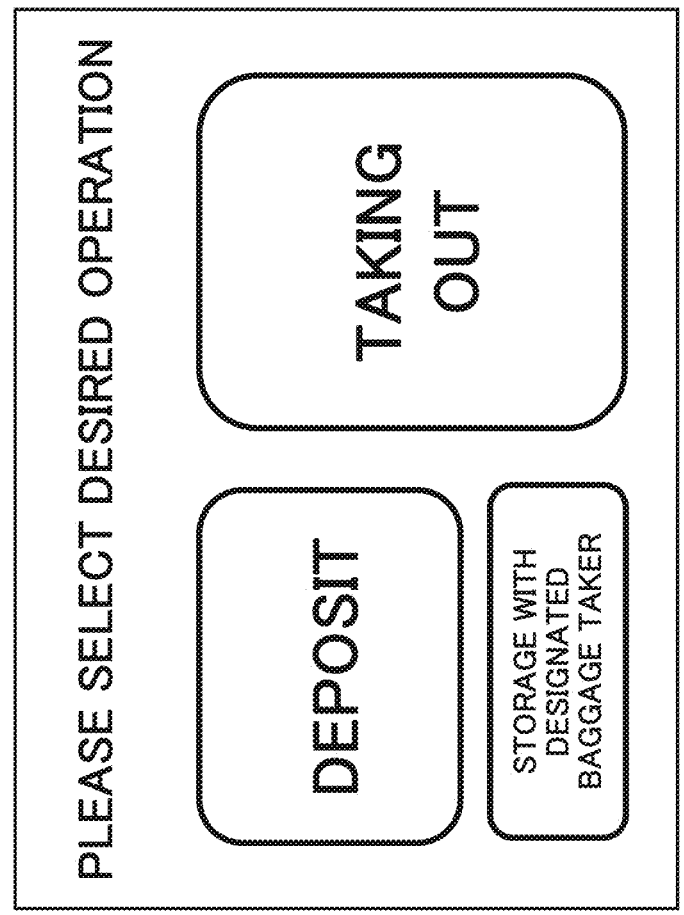
FIG. 26 is a diagram for explaining an operation of a user request determination unit according to a sixth example embodiment.

In addition to acquiring the request of the user described above, the user request determination unit 303 of the biometric authentication compatible locker 10 can acquire information on the baggage taker. Specifically, the user request determination unit 303 performs display as illustrated in FIG. 26 to enable the user to designate the baggage taker.

Figure 27:
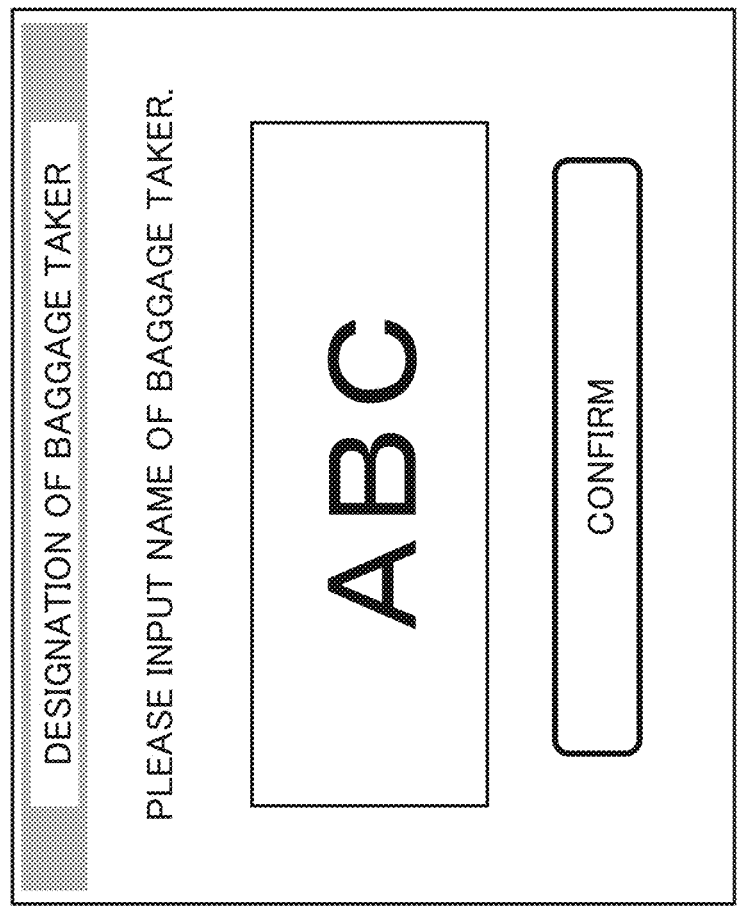
FIG. 27 is a diagram for explaining an operation of the user request determination unit according to the sixth example embodiment.

For example, when the user presses a "storage with taker designation" button, the user request determination unit 303 performs a display as illustrated in FIG. 27. The user in contact with the screen as illustrated in FIG. 27 inputs a name of a person who can take out baggage to the character input area. After inputting the name of the baggage taker, the user presses the confirmation button.

In a case where the user desires "storage with taker designation", the user request determination unit 303 sets the request of the user to "storage with taker designation", and notifies the unlocking request unit 305 of the request together with the name of the designated baggage taker.

The unlocking request unit 305 transmits, to the server device 20, a locker unlocking request including the face image of the baggage storage person, the request of the user (storage with taker designation), and the name of the baggage taker.

The comparison unit 203 of the server device 20 acquires the face image from the locker unlocking request and executes the comparison process. The comparison unit 203 notifies the locker management unit 205 of the user ID (the user ID of the baggage storage person) specified by the comparison process, the request of the user (storage with taker designation), and the name of the baggage taker.

When the request of the user is "storage with taker designation", the comparison unit 203 may not notify the locker management unit 205 of the user ID specified by the comparison process. This is because the comparison process by the comparison unit 203 is processing for ensuring that a person who is going to store baggage in the biometric authentication compatible locker 10 is registered in the system. In other words, in a case where the locker use by the user who is not registered in the system is allowed, the comparison process using the face image of the user is unnecessary.

When the request of the user is "storage with taker designation", the locker management unit 205 searches the user database using the name of the baggage taker as a key, and specifies the corresponding user ID. The locker management unit 205 refers to the locker management database, and selects a locker for storing baggage from among the empty lockers. The locker management unit 205 sets the user ID associated to the name of the baggage taker in the usage status field of the selected locker.

When a baggage recipient (the user designated as a baggage recipient) moves in front of the biometric authentication compatible locker 10, the biometric authentication compatible locker 10 transmits a locker unlocking request including the face image of the user and "taking out baggage" to the server device 20. The server device 20 specifies the user ID by the comparison process using the face image, and specifies the locker to be unlocked. Since the entry storing the user ID of the baggage taker exists in the locker management database, the server device 20 notifies the biometric authentication compatible locker 10 of the locker ID of the entry. The biometric authentication compatible locker 10 unlocks the locker having the notified locker ID. The baggage taker can take out the baggage in the locker.

As described above, the biometric authentication compatible locker 10 according to the sixth example embodiment transmits, to the server device 20, the locker unlocking request including the information regarding the baggage taker (the person who can take out the baggage stored in the locker). The server device 20 specifies the user ID of the baggage taker based on the information on the baggage taker, and sets the user ID of the baggage taker in the usage status field associated to the locker that stores the baggage. As a result, when the baggage taker moves to the front of the biometric authentication compatible locker 10, the authentication processing using the face image of the baggage taker succeeds. The baggage taker can take out the load stored by another person (baggage storage person). Therefore, the baggage having the time difference can be delivered, and the usefulness of the locker management system is improved.

Figure 28:
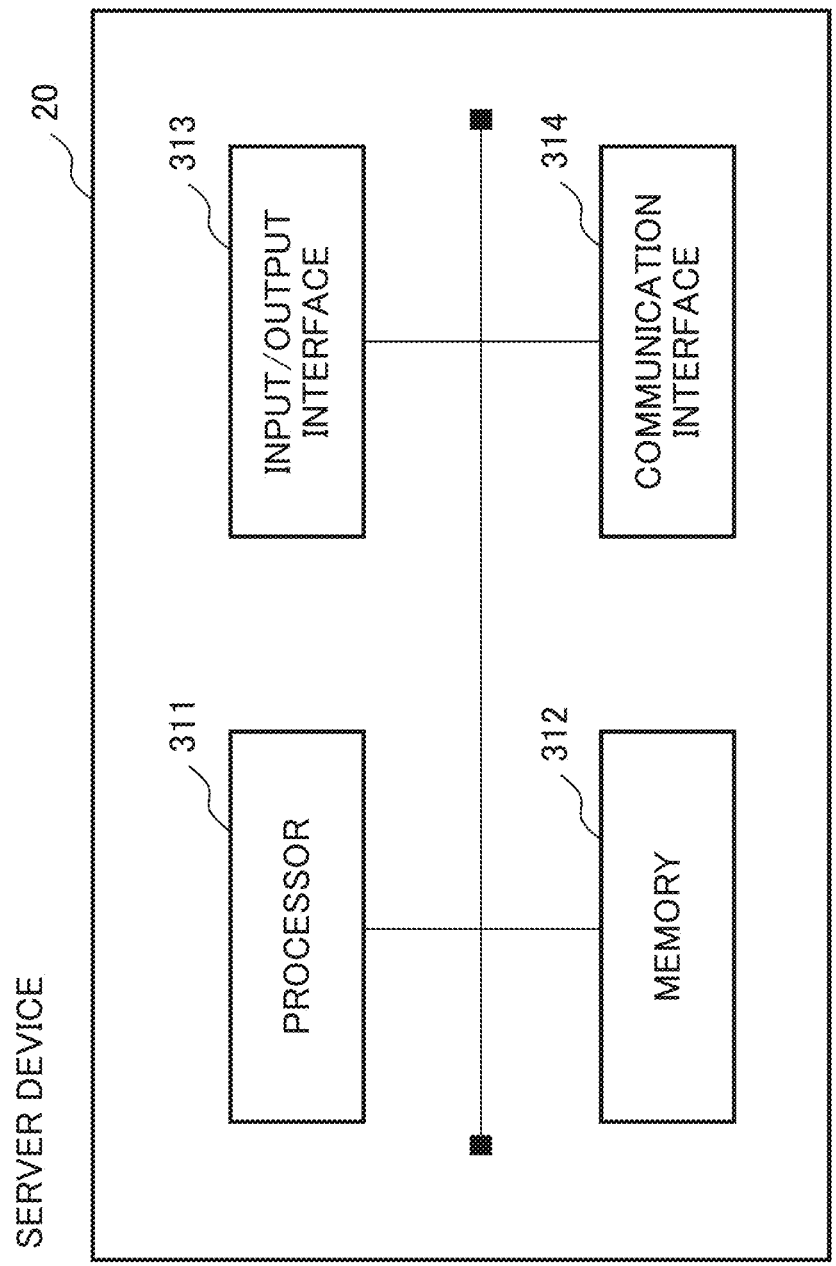
FIG. 28 is a diagram illustrating an example of a hardware configuration of a server device.

Next, hardware of each device constituting an entrance/exit management system will be described. FIG. 28 is a diagram illustrating an example of a hardware configuration of the server device 20.

The server device 20 can be configured by an information processing device (so-called computer), and has the configuration illustrated in FIG. 28. For example, the server device 20 includes a processor 311, a memory 312, an input/output interface 313, a communication interface 314, and the like. The components such as the processor 311 are connected by an internal bus or the like, and are configured to be able to communicate with each other.

However, the configuration illustrated in FIG. 28 is not intended to limit the hardware configuration of the server device 20. The server device 20 may include hardware (not illustrated) or may not include the input/output interface 313 as necessary. The number of processors 311 and the like included in the server device 20 is not limited to the example of FIG. 28, and for example, a plurality of processors 311 may be included in the server device 20.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various program including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a network interface card (NIC) or the like.

The functions of the server device 20 are achieved by various processing modules. The processing module is achieved, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. That is, the present invention can also be embodied as a computer program product. The program can be downloaded via a network or updated using a storage medium storing the program. Further, the processing module may be achieved by a semiconductor chip.

The basic hardware configuration of the biometric authentication compatible locker 10, the terminal 30, and the like is not different from that of the server device 20, and thus description thereof is omitted. For example, the biometric authentication compatible locker 10 may include the display panel 11, the camera 12, and the like.

The server device 20 is equipped with a computer, and the function of the server device 20 can be achieved by causing the computer to execute a program. Similarly, the biometric authentication compatible locker 10 is equipped with a computer, and the function of the biometric authentication compatible locker 10 can be achieved by causing the computer to execute a program. The server device 20 and the biometric authentication compatible locker 10 may cooperatively execute the locker management method, or the biometric authentication compatible locker 10 may independently execute the locker management method.

Modification

The configuration, operation, and the like of the locker management system described in the above example embodiment are merely examples, and are not intended to limit the configuration and the like of the system.

In the above example embodiment, the case where the server device 20 stores the biological information and specifies the locker user has been described. However, the biometric authentication compatible locker 10 may store the biological information and specify the locker user. That is, a part or all of the functions of the server device 20 may be achieved by the biometric authentication compatible locker 10.

The profile of the system user (attribute value of the user) may be input using a scanner or the like. For example, the user inputs an image related to his/her business card to the server device 20 using a scanner. The server device 20 performs optical character recognition (OCR) processing is executed. The server device 20 may determine the profile of the user on the basis of the obtained information.

In the above example embodiment, the case where the biological information related to the "face image" is transmitted from the biometric authentication compatible locker 10 and the terminal 30 to the server device 20 has been described. However, the biological information related to "the feature amount generated from the face image" may be transmitted from the biometric authentication compatible locker 10 or the like to the server device 20. The server device 20 may execute the comparison process with the feature amount registered in the user database using the acquired feature amount (feature vector).

In the above example embodiment, it has been described that the user who exits the free address floor while storing the baggage in the biometric authentication compatible locker 10 is notified of the fact. In such a case, the server device 20 may transmit an e-mail describing that the baggage remains in the locker to the user who exits (has exited) while storing the baggage in the locker.

In the above example embodiment, the case where one user reserves equipment has been described. However, the equipment may be reserved in units of groups. For example, the equipment subscriber may input his/her department as an "equipment subscriber" into the server device 20. In this case, the server device 20 refers to the user database and specifies the input user ID (at least one or more user IDs) of the department to which the server device belongs. The server device 20 sets the specified at least one or more user IDs in the "user ID" field of the equipment management database. When the usage period of the equipment approaches, the server device 20 sets one or more user IDs set in the user ID field in the usage status field of the locker management database (see FIG. 24). A plurality of user IDs (a plurality of user IDs of users having the same department) is set in the usage status field. If the user ID specified by the biometric authentication is included in the plurality of user IDs, the server device 20 instructs the biometric authentication compatible locker 10 to unlock the corresponding locker. As a result, even when the equipment subscriber and the equipment user (borrower) are different, the equipment can be rented out. That is, equipment rents are managed on a group basis (department basis), and only the employees of the permitted department can use the equipment.

In the above example embodiment, the renting of equipment through the locker has been described. The equipment renting and the billing processing associated with the equipment renting may be interlocked. For example, the server device 20 may charge the expense related to the use of the equipment to the subscriber or the equipment borrower who has reserved the equipment. For example, the user registers information regarding a payment method (for example, information related to a credit card.) at the time of system registration of the user. The server device 20 refers to the user database and specifies a billing destination of the equipment usage fee from the user ID of the equipment borrower or the like. The server device 20 executes necessary billing processing for the specified claim destination.

Alternatively, billing associated with use of the equipment may be performed on a department-by-department basis. The server device 20 refers to the user database and specifies the department to which the equipment borrower belongs. The server device 20 may charge the specified belonging department for the cost associated with the use of the equipment. In this case, the server device 20 may refer to, for example, table information in which a department to which the server device belongs and a billing destination thereof are stored, and may execute necessary billing processing.

The server device 20 may control the biometric authentication compatible locker 10 to be available only to the user who has reserved the conference room installed on the free address floor. Specifically, the server device 20 may acquire information of the conference participant (a name or the like of the conference participant) and set the user ID of the conference participant in the usage status field of the locker management database.

The server device 20 may manage equipment renting or the like in conjunction with conference room reservation or the like. For example, the server device 20 acquires detailed information of a conference held in a conference room on the free address floor. For example, the server device 20 acquires information regarding a conference participant, a conference room number, a conference period, a conference theme, and the like. For example, the server device 20 specifies equipment according to the theme of the conference, and sets the user ID of the conference participant to the user of the specified equipment (the user ID field of the equipment management database). The server device 20 sets a conference period in the usage period field of the database. With such a response, equipment in accordance with the conference theme is reserved immediately before the conference time, and when one of the conference participants goes to the biometric authentication compatible locker 10, necessary equipment can be taken out. That is, the locker management system of the disclosure of the present disclosure automatically reserves equipment suitable for a conference theme (agenda), and enables conference participants to use the equipment. The conference participants do not need to perform two of the conference room reservation and the equipment reservation, and can easily borrow necessary equipment.

The server device 20 may perform the billing processing for consumables used in a conference or food and drink (for example, tea, confectionery, and the like) to be provided to a visitor. For example, the server device 20 specifies a person who has opened a locker storing confectionery or the like by face authentication (specifying a user ID). The server device 20 charges a fee for confectionery or the like to the specified user or a department to which the user belongs.

The server device 20 may interlock the use of a locker or the use of a reservation PC (PC installed on the free address floor) of the conference room. The server device 20 refers to the locker management database and specifies the user whose user ID is set in the usage status field. The server device 20 may acquire a login request from the PC and permit the use of the PC by the user (may approve the login request) when the ID included in the login request matches the specified user ID. The server device 20 may similarly permit the use of the PC for the user who has reserved the conference room.

In the above example embodiment, a case where one user who can take out the baggage stored in the locker is designated has been described. However, a plurality of baggage takers may be designated. Alternatively, the baggage storage person may be designated as a "department" as a "baggage taker". In this case, the server device 20 may set the user ID of the user belonging to the designated department in the usage status field of the locker management database. Alternatively, a conference participant may be designated as a baggage taker. In this case, the server device 20 may check the information of the conference and set the user ID of the participant attending the same conference in the use information field of the locker management database. In this manner, the labor of the baggage storage person can be reduced by the designation according to the attribute or the like of the baggage taker by the baggage storage person.

It is conceivable to provide and achieve various applications and services using the biometric authentication compatible locker 10 by allowing the baggage storage person and the baggage taker to be different. For example, a user requests a restaurant or the like to deliver a lunch box, tea, or the like, and an employee of the restaurant designates an orderer as a baggage taker. With such a response, delivery of a lunch box or the like can be performed via the locker. Alternatively, the billing processing (payment) may be performed in conjunction with the transfer. Alternatively, a restaurant, a retail store, or the like may periodically store a predetermined product or the like in a locker and deliver the product to the locker user.

Alternatively, a home delivery agent or the like may be designated as the baggage taker. In this case, when an entrance person of the free address floor sends baggage to the house, it is not necessary to contact a courier or the like. The home delivery agent takes out the baggage from the biometric authentication compatible locker 10, and delivers the baggage to the home (delivery destination) of the baggage storage person. An e-mail may be used for information exchange between the entrance person on the floor and the home delivery agent. The entrance person on the floor transmits an e-mail requesting the home delivery agent to pick up the baggage. The home delivery agent may specify the sender from the transmission source address of the mail and set the home as the delivery destination of the baggage. Alternatively, the entrance person may directly designate the destination of the baggage by e-mail. Alternatively, the home delivery agent may specify the address of the user from the received mail and determine the delivery destination of the baggage. For example, the home delivery agent may set the delivery destination of the baggage to "home" in a case where the e-mail is transmitted from an account of an individual user, and may set the delivery destination of the baggage to "company" in a case where the e-mail is transmitted from an account of a company.

As a specific problem at the time of using the free address flour, a desk of each individual is not determined in the free address flour, and a delivery person of baggage cannot grasp a detailed sending destination (a more detailed sending destination than the free address floor) of the baggage. The locker management system of the present disclosure is also effective for such a problem. That is, the locker management system disclosed in the present disclosure is effective for temporarily storing baggage addressed to an employee (individual) who uses the free address floor. Specifically, the baggage delivery person (baggage distributor in the free address floor) stores the baggage that has arrived on the floor in the biometric authentication compatible locker 10. At that time, the biometric authentication compatible locker 10 provides a GUI for designating the baggage recipient to the deliverer. For example, the user request determination unit 303 of the biometric authentication compatible locker 10 creates a GUI for acquiring a request for "temporary deposit". When temporary deposit is designated, the user request determination unit 303 generates a GUI for inputting information of the baggage recipient (for example, name and the like) (GUI for the deliverer to input the name of the baggage recipient). When acquiring the information (for example, the name) on the baggage recipient, the biometric authentication compatible locker 10 transmits the information to the server device 20. The server device 20 refers to the user database and specifies the user ID of the baggage recipient. After determining the locker in which the baggage is temporarily stored, the server device 20 notifies the biometric authentication compatible locker 10 of the locker ID of the determined locker. At that time, the server device 20 sets the user ID of the baggage recipient in the determined usage status field of the locker. With such a response, the floor user (baggage recipient) can take out the baggage from the biometric authentication compatible locker 10. It is desirable that the server device 20 notify the baggage recipient that the baggage has been temporarily stored, for example, when a locker for temporarily storing the baggage is specified. For example, the server device 20 notifies the baggage recipient of the above information using an e-mail or the like.

In the above example embodiment, the biometric authentication compatible locker 10 acquires the request relating to the locker use of the user, and the server device 20 determines the locker to be unlocked based on the request. However, in the locker management system of the disclosure of the present disclosure, the locker to be unlocked can be specified without using the request relating to the locker use. That is, regarding the user's request (storing and taking out baggage), the locker management system can determine the user's request by face authentication. Specifically, the face image acquisition unit 304 of the biometric authentication compatible locker 10 acquires the face image of the user in front of the user. The face image acquisition unit 304 transmits the face image to the server device 20. The comparison unit 203 of the server device 20 specifies the user ID of the user on the basis of the acquired face image. The locker management unit 205 refers to the locker management database, and determines that the baggage is stored when the specified user ID is not set in the usage status field of the database. On the other hand, if the specified user ID is set in the usage status field of the database, the locker management unit 205 determines that the baggage is taken out. With such a response, the server device 20 can specify the locker to be unlocked without acquiring the request of the user. The biometric authentication compatible locker 10 may also manage the usage status of each locker, and in a case where it is considered that the user further wants to store baggage, a GUI for confirming the presence or absence of a request for additional storage of baggage may be provided to the user.

In the flow diagram (flowchart and sequence diagram) used in the above description, a plurality of steps (processes) are described in order, but the execution order of the steps executed in the example embodiment is not limited to the described order. In the example embodiment, for example, the order of the illustrated steps can be changed within a range in which there is no problem in terms of content, such as executing each process in parallel.

The above example embodiments have been described in detail in order to facilitate understanding of the present disclosure, and it is not intended that all the configurations described above are necessary. In a case where a plurality of example embodiments has been described, each example embodiment may be used alone or in combination. For example, a part of the configuration of the example embodiment can be replaced with the configuration of another example embodiment, or the configuration of another example embodiment can be added to the configuration of the example embodiment. Furthermore, it is possible to add, delete, and replace other configurations for a part of the configuration of the example embodiment.

Although the industrial applicability of the present invention is apparent from the above description, the present invention can be suitably applied to a locker management system or the like performed at a free address floor of a company or the like.

The whole or part of the example embodiments disclosed above can be described as, but not limited to, the following supplementary notes.

Supplementary Note 1

A locker system comprising:
an acquisition unit configured to acquire biological information of a user;
a determination unit configured to determine a request relating to locker use of the user; and
a locker control unit configured to unlock a locker specified based on a request relating to the locker use in relation to a user specified by a comparison process using the biological information.

Supplementary Note 2

The locker system according to Supplementary Note 1, further comprising:
a request unit configured to transmit a locker unlocking request including the biological information and a request relating to the locker use to a server device, in which
the server device specifies the user by a comparison process using biological information included in the locker unlocking request, specifies the locker to be unlocked based on a request relating to the locker use included in the locker unlocking request, and includes a locker ID of the specified locker in a response to the locker unlocking request, and
the locker control unit unlocks a locker based on a response acquired from the server device.

Supplementary Note 3

The locker system according to Supplementary Note 2, in which the determination unit determines a request relating to the locker use based on an action by the user.

Supplementary Note 4

The locker system according to Supplementary Note 3, in which the determination unit determines the request relating to the locker use based on a change related to a face of the user.

Supplementary Note 5

The locker system according to Supplementary Note 3, in which the determination unit determines a request relating to the locker use based on a moving direction of the user.

Supplementary Note 6

The locker system according to any one of Supplementary Notes 2 to 5, further comprising:
a generation unit configured to generate accompanying information related to the user, in which
the request unit transmits a locker unlocking request including the generated accompanying information to the server device, and
the locker control unit unlocks a locker selected by the server device using the accompanying information.

Supplementary Note 7

The locker system according to Supplementary Note 6, in which the generation unit generates information regarding a height of the user as the accompanying information.

Supplementary Note 8

The locker system according to Supplementary Note 6, in which the generation unit generates information regarding a size of baggage carried by the user as the accompanying information.

Supplementary Note 9

The locker system according to Supplementary Note 2, in which
the determination unit does not determine a request relating to the locker use of the user,
the request unit transmits a locker unlocking request including the biological information to a server device, and
the server device specifies the user by a comparison process using biological information included in the locker unlocking request, and specifies the locker to be unlocked based on whether the specified user uses the locker.

Supplementary Note 10

A locker management system comprising:
a server device; and
a locker system connected to the server device, in which the locker system includes:
an acquisition unit configured to acquire biological information of a user;
a determination unit configured to determine a request relating to locker use of the user;
a request unit configured to transmit a locker unlocking request including the biological information and a request relating to the locker use to the server device; and
a locker control unit configured to unlock a locker based on a response acquired from the server device, and
the server device specifies the user by a comparison process using biological information included in the locker unlocking request, specifies the locker to be unlocked based on a request relating to the locker use included in the locker unlocking request, and includes a locker ID of the specified locker in a response to the locker unlocking request.

Supplementary Note 11

The locker management system according to Supplementary Note 10, in which
the server device includes:
a user database configured to store at least a user ID for identifying the user and biological information in association with each other;
a locker management database configured to store at least the locker ID of each locker of the locker system and a usage status of each locker in association with each other;
a comparison unit configured to refer to the user database and specify the user ID associated to biological information included in the locker unlocking request; and
a locker management unit configured to select a locker for storing baggage and set the specified user ID in a usage status field of the locker management database associated to the selected locker in a case where the request relating to the locker use is storage of baggage, and
the locker management unit notifies the locker system of a locker ID of the selected locker.

Supplementary Note 12

The locker management system according to Supplementary Note 11, in which the locker management unit refers to the locker management database, specifies the locker ID in which the specified user ID is set in the usage status field, and notifies the locker system of the specified locker ID in a case where the request relating to the locker use is taking out baggage.

Supplementary Note 13

The locker management system according to Supplementary Note 11 or 12, further comprising:
an exit management terminal configured to control a gate that restricts exit of a user, in which
the exit management terminal transmits biological information of an exit person to the server device,
the comparison unit specifies a user ID of the exit person by a comparison process using biological information of the exit person, and
in a case where a user ID of the specified exit person is set in the usage status field, the locker management unit notifies the exit management terminal of mislaying of baggage.

Supplementary Note 14

The locker management system according to any one of Supplementary Note 11 to 13, in which the server device further includes: an equipment management unit configured to manage equipment stored in the locker system; and an equipment management database configured to store a user ID of a user who has reserved the equipment, a reserved equipment, and a usage period of the reserved equipment in association with each other, and the equipment management unit sets a user ID of a user who has reserved the equipment in the usage status field of a locker that stores the reserved equipment before the usage period of the reserved equipment arrives.

Supplementary Note 15

The locker management system according to any one of Supplementary Notes 11 to 14, in which the request unit transmits, to the server device, the locker unlocking request including information regarding a baggage taker who can take out baggage stored in the locker, and the locker management unit specifies a user ID of the baggage taker based on information regarding the baggage taker, and sets the user ID of the baggage taker in the usage status field associated to a locker that stores baggage.

Supplementary Note 16

A locker management method that is performed in a locker system, comprising:

acquiring biological information of a user;

determining a request relating to locker use of the user; and unlocking a locker specified based on a request relating to the locker use in relation to a user specified by a comparison process using the biological information.

Supplementary Note 17

A computer-readable storage medium storing a program for causing a computer mounted on a locker system to execute processing of:

acquiring biological information of a user;

determining a request relating to locker use of the user; and unlocking a specified locker based on the request relating to the locker use in relation to the user specified by a comparison process using the biological information.

The disclosures of the cited prior art documents are incorporated herein by reference. Although the example embodiments of the present invention have been described above, the present invention is not limited to these example embodiments. It will be understood by those of ordinary skilled in the art that these example embodiments are exemplary only and that various variations are possible without departing from the scope and spirit of the present invention. That is, it goes without saying that the present invention includes various modifications and corrections that can be made by those skilled in the art in accordance with the entire disclosure including the claims and the technical idea.

REFERENCE SIGNS LIST 10 biometric authentication compatible locker
11 display panel
12 camera
20 server device
30-1 entrance management terminal
30-2 exit management terminal
31 gate
40 camera device
100 locker system
101 acquisition unit
102 determination unit
103, 306 locker control unit
201, 301, 401 communication control unit
202 user registration unit
203 comparison unit
204 user management unit
205 locker management unit
206, 307, 404 storage unit
207 equipment management unit
211 user information acquisition unit
212 ID generation unit
213 feature amount generation unit
214 entry management unit
302 user detection unit
303 user request determination unit
304, 402 face image acquisition unit
305 unlocking request unit
308 accompanying information generation unit
311 processor
312 memory
313 input/output interface
314 communication interface
403 gate control unit

What is claimed is:

1. A locker system comprising:
one or more memories storing instructions; and
one or more processors configured to execute the instructions to:
  receive a signal from a camera;
  acquire a face image of a first user based on the signal;
  calculate a feature vector from the face image;
  authenticate the first user through one-to-many comparison by using the calculated feature vector and a plurality of feature vectors registered in a server, to identify the first user;
  retrieve a user identifier of the first user that has been identified;
  prompt the first user whether the first user wants to put in or take out an item from a locker, by displaying a first gesture the first user has to perform to indicate that the first user wants to put in the item in the locker and a second gesture that the first user has to perform to indicate that the first user wants to take the item from the locker;
  acquire an image, different than the first image;
  determine, from the acquired image, whether the first user has performed the first gesture or has performed the second gesture;
  in a case where the first user has performed the first gesture, select the locker as one that is empty, and unlock the locker that has been selected to permit the user to open the locker and put the item in the locker; and
  in a case where the first user has performed the second gesture, determine the locker as one that the first user has previously put the item in, and unlock the locker that has been determined to permit the user to open the locker and take out the item from the locker.

2. The locker system according to claim 1, wherein analyzing the acquired face image comprises detecting a change related to the face of the first user.

3. The locker system according to claim 2, wherein the change related to the face of the first user comprises at least one of eye gestures or head movements.

4. A locker management method performed by a computer and comprising:

receiving a signal from a camera;

acquiring a face image of a first user based on the signal;

calculating a feature vector from the face image;

authenticating the first user through one-to-many comparison by using the calculated feature vector and a plurality of feature vectors registered in a server, to identify the first user;

retrieving a user identifier of the first user that has been identified;

prompting the first user whether the first user wants to put in or take out an item from a locker, by displaying a first gesture the first user has to perform to indicate that the first user wants to put in the item in the locker and a second gesture that the first user has to perform to indicate that the first user wants to take the item from the locker;

acquiring an image, different than the first image, from the signal;

determining, from the acquired image, whether the first user has performed the first gesture or has performed the second gesture;

in a case where the first user has performed the first gesture, selecting the locker as one that is empty, and unlocking the locker that has been selected to permit the user to open the locker and put the item in the locker; and in a case where the first user has performed the second gesture, determining the locker as one that the first user has previously put the item in, and unlocking the locker that has been determined to permit the user to open the locker and take out the item from the locker.

5. A non-transitory computer readable medium storing a program executable a computer to perform processing comprising:

receiving a signal from a camera;

acquiring a face image of a first user based on the signal;

calculating a feature vector from the face image;

authenticating the first user through one-to-many comparison by using the calculated feature vector and a plurality of feature vectors registered in a server, to identify the first user;

retrieving a user identifier of the first user that has been identified;

prompting the first user whether the first user wants to put in or take out an item from a locker, by displaying a first gesture the first user has to perform to indicate that the first user wants to put in the item in the locker and a second gesture that the first user has to perform to indicate that the first user wants to take the item from the locker;

acquiring an image, different than the first image, from the signal;

determining, from the acquired image, whether the first user has performed the first gesture or has performed the second gesture;

in a case where the first user has performed the first gesture, selecting the locker as one that is empty, and unlocking the locker that has been selected to permit the user to open the locker and put the item in the locker; and in a case where the first user has performed the second gesture, determining the locker as one that the first user has previously put the item in, and unlocking the locker that has been determined to permit the user to open the locker and take out the item from the locker.

* * * * *